(12) United States Patent
Matsumoto et al.

(10) Patent No.: US 10,336,336 B2
(45) Date of Patent: Jul. 2, 2019

(54) VEHICULAR CONTROL APPARATUS

(71) Applicant: TOYOTA JIDOSHA KABUSHIKI KAISHA, Toyota-shi, Aichi-ken (JP)

(72) Inventors: Kentaro Matsumoto, Yokohama (JP); Kazuaki Aso, Gotenba (JP); Junichi Morimura, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 198 days.

(21) Appl. No.: 15/385,207

(22) Filed: Dec. 20, 2016

(65) Prior Publication Data
US 2017/0183013 A1 Jun. 29, 2017

(30) Foreign Application Priority Data
Dec. 25, 2015 (JP) .................. 2015-254481

(51) Int. Cl.
*B60W 30/18* (2012.01)

(52) U.S. Cl.
CPC ... *B60W 30/18163* (2013.01); *B60W 2550/30* (2013.01)

(58) Field of Classification Search
None
See application file for complete search history.

(56) References Cited

U.S. PATENT DOCUMENTS

| | | | |
|---|---|---|---|
| 2007/0115105 A1 | 5/2007 | Schmitz | |
| 2008/0243351 A1* | 10/2008 | Isogai | B60W 30/16 701/96 |
| 2010/0198478 A1* | 8/2010 | Shin | B60W 10/06 701/96 |
| 2012/0078484 A1* | 3/2012 | Kato | B60W 30/143 701/96 |
| 2012/0253629 A1* | 10/2012 | Maruyama | G08G 1/22 701/96 |
| 2013/0116861 A1* | 5/2013 | Nemoto | B60W 30/16 701/2 |
| 2013/0184926 A1* | 7/2013 | Spero | B62D 1/28 701/26 |

(Continued)

FOREIGN PATENT DOCUMENTS

| | | |
|---|---|---|
| JP | 2002-099998 A | 4/2002 |
| JP | 2003025868 A | 1/2003 |

(Continued)

*Primary Examiner* — Navid Ziaeianmehdizadeh
(74) *Attorney, Agent, or Firm* — Sughrue Mion, PLLC

(57) ABSTRACT

A vehicular control apparatus includes at least one electronic control unit. The at least one electronic control unit is configured to recognize a first preceding vehicle in a driving lane and to calculate a first target acceleration of the vehicle. The at least one electronic control unit is also configured to recognize a second preceding vehicle in an adjacent lane, and to calculate a second target acceleration of the vehicle. The at least one electronic control unit is configured to acquire lane change information of the vehicle, and to select the smaller of the first target acceleration and the second target acceleration as a target acceleration of the vehicle. The at least one electronic control unit is configured to control a speed of the vehicle in a lane change period by using the selected target acceleration.

10 Claims, 11 Drawing Sheets

(56) References Cited

U.S. PATENT DOCUMENTS

| | | | | |
|---|---|---|---|---|
| 2014/0292545 | A1* | 10/2014 | Nemoto | G08G 1/163 340/988 |
| 2015/0094927 | A1* | 4/2015 | Takahashi | B60W 30/025 701/93 |
| 2015/0353087 | A1* | 12/2015 | Niino | B60W 30/16 701/96 |
| 2015/0360684 | A1* | 12/2015 | Matsuno | B60Q 9/00 701/23 |
| 2015/0360721 | A1* | 12/2015 | Matsuno | B62D 15/0255 701/41 |
| 2015/0367854 | A1* | 12/2015 | Ezoe | B60W 30/14 701/1 |
| 2015/0375748 | A1* | 12/2015 | Nagase | B60W 30/0953 701/41 |
| 2016/0272204 | A1* | 9/2016 | Takahashi | B60W 30/143 |
| 2016/0325750 | A1* | 11/2016 | Kanda | B60W 30/18163 |
| 2016/0339913 | A1* | 11/2016 | Yamashita | B60W 30/146 |
| 2016/0375905 | A1* | 12/2016 | Park | B60W 30/16 701/96 |
| 2017/0008522 | A1* | 1/2017 | Sato | B60W 10/04 |
| 2017/0021833 | A1* | 1/2017 | Abdel-Rahman | B60W 30/165 |
| 2017/0120912 | A1* | 5/2017 | Ishioka | B60W 30/143 |
| 2017/0341652 | A1* | 11/2017 | Sugawara | B60W 50/14 |
| 2018/0188735 | A1* | 7/2018 | Sugawara | B60W 30/095 |

FOREIGN PATENT DOCUMENTS

| | | | |
|---|---|---|---|
| JP | 2003-063273 | A | 3/2003 |
| JP | 2006-515545 | A | 6/2006 |

* cited by examiner a2 = a1 a2 = a1 a2 < a1 a2 > a1 a2 < a1 a2 > a1 a2 < a1 a2 > a1

VEHICULAR CONTROL APPARATUS

INCORPORATION BY REFERENCE

The disclosure of Japanese Patent Application No. 2015-254481 filed on Dec. 25, 2015 including the specification, drawings and abstract is incorporated herein by reference in its entirety.

BACKGROUND

1. Technical Field

The present disclosure relates to a vehicular control apparatus.

2. Description of Related Art

In Japanese Patent Application Publication No. 2003-63273 (JP 2003-63273 A), there is described a control apparatus that realizes overtaking through automatic driving during automatic speed control. The control apparatus targets a preceding vehicle (a first preceding vehicle) running in front of a vehicle in a driving lane, and causes the vehicle to follow this preceding vehicle. The control apparatus determines whether or not there is another vehicle behind and beside the vehicle in an adjacent lane in overtaking the first preceding vehicle. Then, the control apparatus stops the vehicle from overtaking the first preceding vehicle when there is another vehicle behind and beside the vehicle in the adjacent lane, and causes the vehicle to overtake the first preceding vehicle when there is no other vehicle behind and beside the vehicle in the adjacent lane.

SUMMARY

By the way, as a driving scene other than overtaking, there is a case where a lane change is carried out during automatic speed control targeting the first preceding vehicle. In the case of a lane change, it is difficult to regard the lane change as practical unless it can be carried out even when there is another vehicle (a second preceding vehicle) in front of and beside the vehicle in an adjacent lane. Therefore, it is conceivable to improve the apparatus described in Japanese Patent Application Publication No. 2003-63273 (JP 2003-63273 A) such that a lane change is carried out even in the case where the second preceding vehicle exists.

In the case where the apparatus described in Japanese Patent Application Publication No. 2003-63273 (JP 2003-63273 A) is improved as described above, the vehicle subjected to automatic speed control runs targeting the first preceding vehicle, so the speed of the vehicle may also be assumed to be higher than that of the second preceding vehicle. In this case, when the vehicle carries out a lane change to the adjacent lane, abrupt deceleration may become necessary to secure an inter-vehicle distance between the vehicle and the second preceding vehicle.

In the present technical field, it is preferable to suppress the occurrence of abrupt deceleration when a vehicle that is subjected to automatic speed control targeting a preceding vehicle running in front of the vehicle in a driving lane carries out a lane change to an adjacent lane in which there is another preceding vehicle.

An aspect of the disclosure provides a vehicular control apparatus including at least one electronic control unit. The at least one electronic control unit is configured to recognize a first preceding vehicle running in front of a vehicle in a driving lane where the vehicle is running, and to calculate a first target acceleration of the vehicle based on a recognition result of the recognized first preceding vehicle. And the at least one electronic control unit is configured to recognize a second preceding vehicle running in front of the vehicle in a lane located adjacent to the driving lane, and to calculate a second target acceleration of the vehicle based on a recognition result of the recognized second preceding vehicle. The at least one electronic control unit is also configured to acquire lane change information indicating a direction in which the vehicle carries out a lane change, and select the smaller of the first target acceleration and the second target acceleration as a target acceleration of the vehicle in a lane change period at a time when the second preceding vehicle exists in an adjacent lane. And the adjacent lane is located adjacent to the driving lane in the direction indicated by the lane change information as viewed from the driving lane. The at least one electronic control unit is also configured to control a speed of the vehicle in the lane change period by using the selected target acceleration. The vehicular control apparatus includes at least one actuator configured to control the speed of the vehicle.

In this vehicular control apparatus, the first target acceleration of the vehicle is calculated based on the speed of the first preceding vehicle running in the driving lane. When the ON signal of the direction indicator is acquired, the second target acceleration of the vehicle is calculated based on the speed of the second preceding vehicle running in the adjacent lane. Then, the smaller of the first target acceleration and the second target acceleration is selected as the target acceleration during the lane change. Therefore, as an example, when the second preceding vehicle running in the adjacent lane is slower than the first preceding vehicle as the target of speed control, the target acceleration during the lane change is set to the second target acceleration based on the second preceding vehicle running in the adjacent lane. Accordingly, the vehicle can start running with reference to the second preceding vehicle at an earlier stage than in the case where the target acceleration during the lane change is identified with the first target acceleration. In consequence, when the vehicle that is subjected to automatic speed control targeting the first preceding vehicle running in front of the vehicle in the driving lane carries out a lane change to the adjacent lane in which the second preceding vehicle exists, the occurrence of abrupt deceleration can be suppressed. Besides, as an example, when the second preceding vehicle running in the adjacent lane is faster than the first preceding vehicle as the target of speed control, the target acceleration during the lane change is set to the first target acceleration based on the first preceding vehicle running in the adjacent lane. Accordingly, an inter-vehicle distance between the vehicle and the first preceding vehicle can be secured during the lane change. As described hitherto, this vehicular control apparatus can restrain the speed of the vehicle from abruptly changing during a lane change.

In the aspect of the disclosure, the at least one electronic control unit may be configured to recognize the second preceding vehicle in the adjacent lane, when the lane change information is acquired.

In the aspect of the disclosure, the at least one electronic control unit may be configured to generate a running locus when the vehicle runs from the driving lane to the adjacent lane, and to control steering of the vehicle based on the running locus.

By adopting this configuration, when the vehicle that is subjected to automatic speed control targeting the preceding vehicle running in front of the vehicle in the driving lane carries out a lane change to an adjacent lane in which there is another preceding vehicle through automatic steering control, the occurrence of abrupt deceleration can be suppressed.

In the aspect of the disclosure, the at least one electronic control unit may be configured to set the second target acceleration as the target acceleration of the vehicle in the lane change period at a time when the second target acceleration is smaller than the first target acceleration.

In the aspect of the disclosure, the at least one electronic control unit may be configured to set the first target acceleration as the target acceleration of the vehicle in the lane change period at a time when the second target acceleration is larger than the first target acceleration.

In the aspect of the disclosure, the at least one electronic control unit may be configured to calculate the first target acceleration based on a first relative distance between the vehicle and the first preceding vehicle, and a first relative speed between the vehicle and the first preceding vehicle, and to calculate the second target acceleration based on a second relative distance between the vehicle and the second preceding vehicle, and a second relative speed between the vehicle and the second preceding vehicle.

In the aspect of the disclosure, the at least one electronic control unit may be configured to calculate an acceleration required to make the speed of the vehicle equal to a speed of the first preceding vehicle while the vehicle moves by the relative distance from the first preceding vehicle, as the first target acceleration, and to calculate an acceleration required to make the speed of the vehicle equal to a speed of the second preceding vehicle while the vehicle moves by the relative distance from the second preceding vehicle, as the second target acceleration.

In the aspect of the disclosure, the at least one electronic control unit may be configured to acquire an ON signal of a direction indicator mounted in the vehicle, as the lane change information.

In the aspect of the disclosure, the at least one electronic control unit may be configured to control the speed of the vehicle, by using the target acceleration, at least from a time point when the lane change information is acquired to a time point when the second preceding vehicle is recognized as a preceding vehicle running in a same lane where the vehicle exists.

In the aspect of the disclosure, the at least one electronic control unit may be configured to accelerate the vehicle from a time point when part of the vehicle enters the adjacent lane in the lane change period.

According to the aspect of the disclosure and the embodiments thereof, when the vehicle that is subjected to automatic speed control targeting the preceding vehicle running in front of the vehicle in the driving lane carries out a lane change to an adjacent lane in which there is another preceding vehicle, the occurrence of abrupt deceleration can be suppressed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The embodiments of the disclosure will be described hereinafter with reference to the drawings. Incidentally, in the following description, like or equivalent elements will be denoted by like reference symbols, and redundant description will be omitted.

First Embodiment

[Outline of Vehicle]

Figure 1:
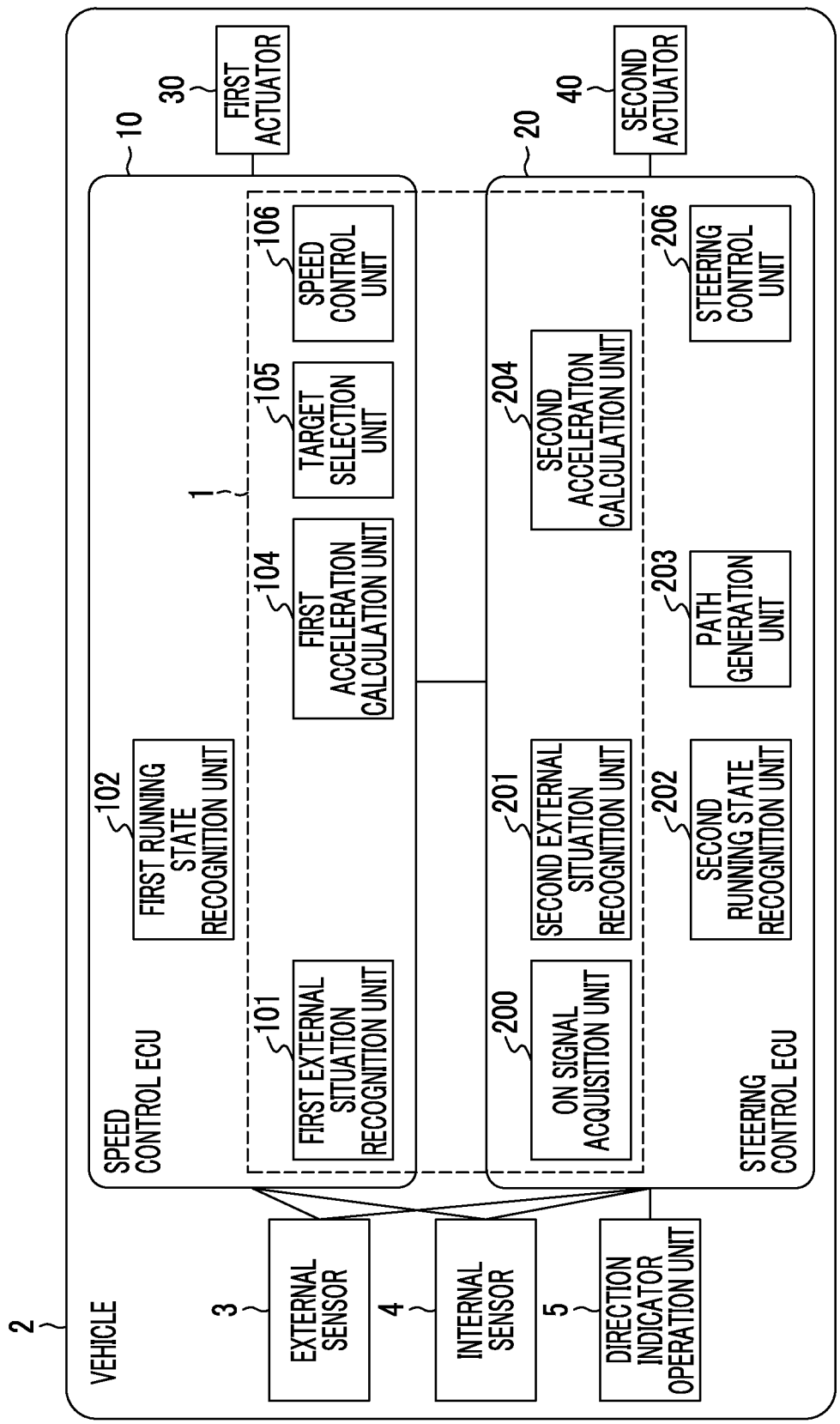
FIG. 1 is a block diagram illustrating the configuration of a vehicle that is equipped with a vehicular control apparatus according to the first embodiment of the disclosure.

FIG. 1 is a block diagram illustrating the configuration of a vehicle 2 that is equipped with a vehicular control apparatus 1 according to the first embodiment of the disclosure. As shown in FIG. 1, the vehicular control apparatus 1 is mounted in the vehicle 2 such as a passenger vehicle or the like. As will be described later, the vehicular control apparatus 1 controls the speed of the vehicle 2 during a lane change. A case where the lane change of the vehicle 2 is carried out through automatic steering control will be described hereinafter. That is, the vehicle 2 runs through automatic speed control and automatic steering control.

The vehicle 2 is equipped with an external sensor 3, an internal sensor 4, a speed control ECU (an electronic control unit) 10, a steering control ECU 20, a first actuator 30 and a second actuator 40. The external sensor 3, the internal sensor 4, the speed control ECU 10, the steering control ECU 20, the first actuator 30 and the second actuator 40 are connected to a network that establishes communication through the use of a controller area network (CAN) communication circuit, and can communicate with one another.

[Configuration of Group of Sensors and Operation Portion]

First of all, a group of sensors and an operation portion of the vehicle 2 will be described. The external sensor 3 is a detector that detects information on an external situation of the vehicle 2. The external situation is a situation around the vehicle 2, for example, objects that exist around the vehicle 2 and a running environment of the vehicle 2. The objects are tangible entities such as a preceding vehicle, a pedestrian, a stationary body (a guardrail etc.) and the like. The running environment is a lane width, lane borderlines and the like of a road on which the vehicle 2 runs.

As an example of the external sensor 3 that detects an object, a LIDAR (laser imaging detection and ranging) is employed. The LIDAR detects an object around the vehicle 2 through the use of laser light. As a concrete example, the LIDAR transmits laser light into a radiation range around the vehicle 2. If there is an object reflecting laser light within the radiation range, the LIDAR acquires reflected light. The LIDAR detects a relative distance between the vehicle 2 and the object based on a time from radiation of laser light to return thereof as reflected light. The LIDAR detects a relative speed between the vehicle 2 and the object based on a change in frequency of reflected light. The LIDAR detects a direction of the object based on an angle of reflected light. The LIDAR outputs a detection result to the speed control ECU 10 and the steering control ECU 20. The detection result is information obtained through a detection operation of the LIDAR, and includes at least the above-mentioned relative distance, the above-mentioned relative speed and the above-mentioned direction.

As an example of the external sensor 3 that detects an object and a running environment, a camera as an imaging device that photographs the periphery of the vehicle 2 is employed. As an example, the camera is provided on the back side of a windshield of the vehicle 2. The camera outputs image information around the vehicle 2 to the speed control ECU 10 and the steering control ECU 20. The image information is obtained by converting an optical signal in a predetermined image format.

The internal sensor 4 is a detector that detects information corresponding to the running state of the vehicle 2. As an example of the internal sensor 4, a speed sensor is employed. The speed sensor is a detector that detects a speed of the vehicle 2. As an example of the speed sensor, a wheel speed sensor that detects a rotational speed of a wheel is employed. The wheel of the vehicle 2, a drive shaft that rotates integrally with the wheel, or the like is provided with the wheel speed sensor. The speed sensor outputs speed information (wheel speed information) including the speed of the vehicle 2 to the speed control ECU 10 and the steering control ECU 20.

A direction indicator operation portion 5 is an operation portion for operating direction indicators, and is a switch, a lever or the like. Each of the direction indicators is a piece of equipment that indicates a course direction of the vehicle 2. The vehicle 2 is provided with the direction indicator for a right direction and the direction indicator for a left direction. The direction indicator operation portion 5 receives an ON/OFF operation of the direction indicator for the right direction, and an ON/OFF operation of the direction indicator for the left direction. A driver's ON operation is an operation of activating the direction indicator corresponding to a direction designated by the driver. The driver's OFF operation is an operation of switching off the direction indicator. The direction indicator operation portion 5 receives the driver's ON/OFF operations, and outputs an ON signal/an OFF signal to a corresponding one of the direction indicators. The ON signal is a signal for lighting or blinking each of the direction indicators. The OFF signal is a signal for switching off each of the direction indicators. The ON signal and the OFF signal are associated with a corresponding one of the direction indicators (i.e., for the right direction or the left direction). The direction indicator operation portion 5 outputs the ON/OFF signals of each of the direction indicators to the steering control ECU 20.

[Outline of ECU's]

Next, the configuration of the speed control ECU 10 and the steering control ECU 20 will be described. Each of the speed control ECU 10 and the steering control ECU 20 is an electronic control unit having a central processing unit (a CPU), a read only memory (a ROM), a random access memory (a RAM), a CAN communication circuit and the like. The speed control ECU 10 and the steering control ECU 20 control pieces of hardware based on a signal output by the CPU, and realize the functions of components that will be described later. As a more concrete example of operation, each of the speed control ECU 10 and the steering control ECU 20 triggers the CAN communication circuit to have data input/output thereto/therefrom, stores the input data into the RAM, loads a program stored in the ROM into the RAM, and executes the program loaded into the RAM.

The speed control ECU 10 executes a process regarding automatic speed control of the vehicle 2. Upon acquiring an ON signal of one of the direction indicators, the steering control ECU 20 executes a process regarding automatic speed control and a process regarding automatic steering control during a lane change. That is, the speed control ECU 10 has a result calculated by the steering control ECU 20 input thereto during the lane change, and performs automatic speed control of the vehicle 2.

[Configuration Regarding Automatic Speed Control]

First of all, the configuration regarding automatic speed control will be described. The speed control ECU 10 is connected to the external sensor 3 and the internal sensor 4. The speed control ECU 10 is equipped with a first external situation recognition unit (a first recognition unit) 101, a first running state recognition unit 102, a first acceleration calculation unit 104, a target selection unit 105 and a speed control unit 106.

The first external situation recognition unit 101 recognizes a first preceding vehicle running in front of the vehicle 2 in a driving lane where the vehicle 2 runs. The driving lane is a lane in which the vehicle 2 runs. The first preceding vehicle is a vehicle running in the same lane as the vehicle 2 (the driving lane), and is a vehicle running in front of the vehicle 2. In the case where the vehicle 2 runs in a right lane on a road with two lanes on one side, the driving lane is the right lane, and the first preceding vehicle is a preceding vehicle running in the right lane. In the case where the vehicle 2 runs in a left lane on a road with two lanes on one side, the driving lane is the left lane, and the first preceding vehicle is a preceding vehicle running in the left lane.

The first external situation recognition unit 101 acquires information on an external situation from the external sensor 3. Then, the first external situation recognition unit 101 recognizes the first preceding vehicle based on the acquired information. Recognition consists of identification of a target and acquisition or calculation of information on the target. As a concrete example, the first external situation recognition unit 101 recognizes a preceding vehicle or preceding vehicles and the lane borderlines of the driving lane, based on image information acquired by the camera. Then, the first external situation recognition unit 101 recognizes the preceding vehicle located in the driving lane as the first preceding vehicle. Then, the first external situation recognition unit 101 recognizes a relative distance and a relative speed between the vehicle 2 and the first preceding vehicle, based on at least one of the image information and a detection result of the LIDAR.

Figure 2:
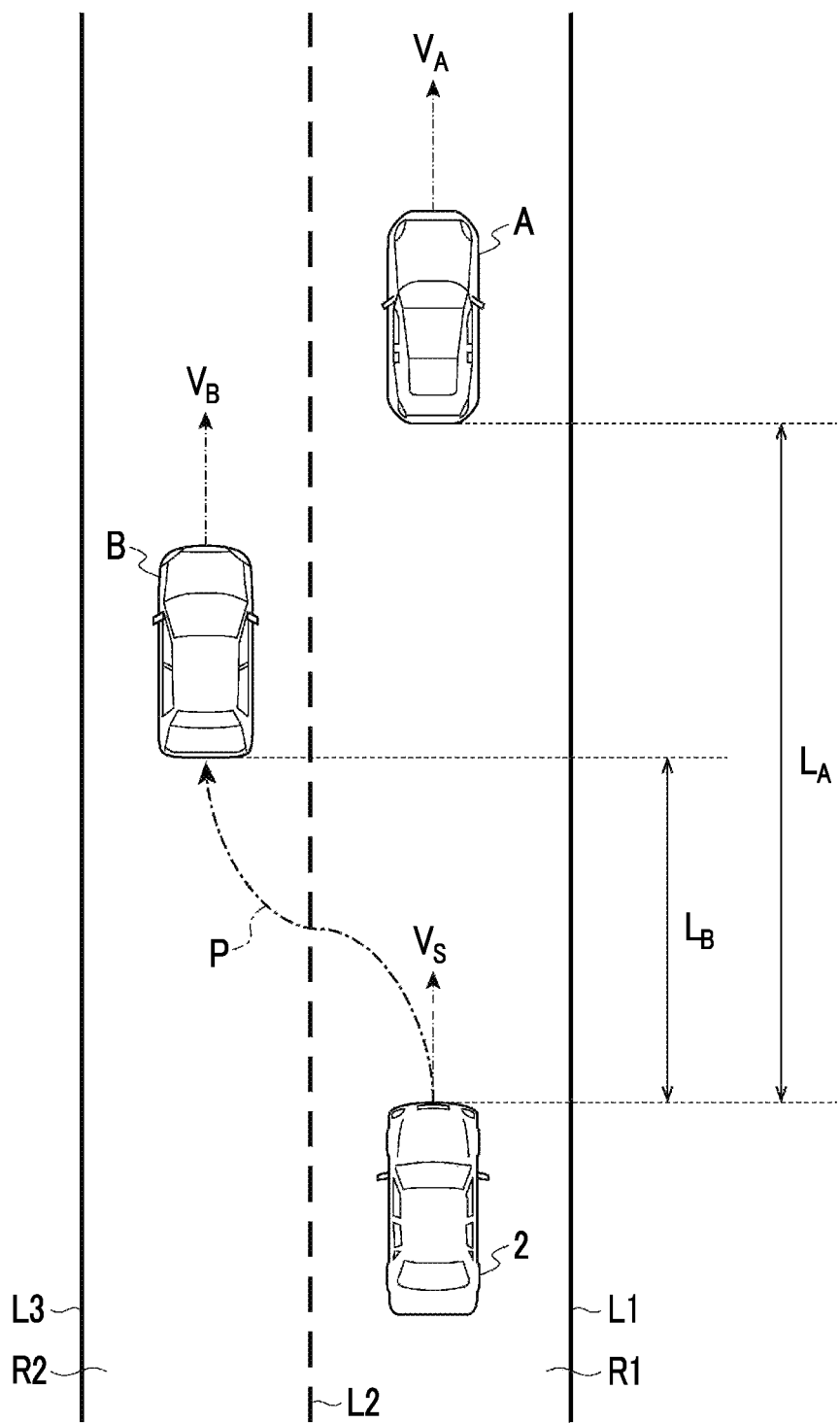
FIG. 2 is a view of an exemplary running scene of the vehicle.

FIG. 2 is a view of an exemplary running scene of the vehicle 2. In the running scene shown in FIG. 2, a road has a right lane R1 that is marked out by a right lane borderline L1 and a central lane borderline L2, and a left lane R2 that is marked out by a left lane borderline L3 and the central lane borderline L2. The vehicle 2 runs in the right lane R1. Therefore, in the running scene shown in FIG. 2, the driving lane of the vehicle 2 is the right lane R1. Then, a preceding vehicle A running in the right lane R1 is the first preceding vehicle. The first external situation recognition unit 101 recognizes the preceding vehicle A (the first preceding vehicle) running in front of the vehicle 2 in the right lane R1 in which the vehicle 2 runs.

The first running state recognition unit 102 recognizes a running state of the vehicle 2 from a detection result of the internal sensor 4. As an example, the first running state recognition unit 102 recognizes a speed $V_S$ of the vehicle 2 based on a detection result of the speed sensor.

The first acceleration calculation unit 104 calculates a first target acceleration of the vehicle 2 based on a recognition result of the first preceding vehicle recognized by the first external situation recognition unit 101. The recognition result is information on a running state of the first preceding vehicle, for example, a relative distance $L_A$ and a relative speed $V_{DA}$ between the vehicle 2 and the first preceding vehicle. The first acceleration calculation unit 104 calculates a first target acceleration such that the speed of the vehicle 2 approaches the speed of the first preceding vehicle while the vehicle 2 moves by a predetermined distance. As an example, the first acceleration calculation unit 104 calculates the first target acceleration of the vehicle 2 such that the speed of the vehicle 2 becomes equal to the speed of the first preceding vehicle while the vehicle 2 moves by the relative distance $L_A$. Given that $L_A$ denotes the relative distance (an inter-vehicle distance) between the vehicle 2 and the first preceding vehicle, and that $V_A$ denotes a speed of the first preceding vehicle that is also obtained from the relative speed $V_{DA}$ and the speed $V_S$ of the vehicle 2, the first acceleration calculation unit 104 calculates a first target acceleration a1 through the use of, for example, a mathematical expression 1 shown below.

$$a1 = (V_A^2 - V_S^2)/2 \cdot L_A \quad (1)$$

The target selection unit 105 selects a target acceleration that is eventually used for speed control, through the use of the first target acceleration a1 and a later-described second target acceleration calculated by the steering control ECU 20. Upon acquiring an ON signal of one of the direction indicators, the steering control ECU 20 calculates the second target acceleration. When the second target acceleration is calculated by the steering control ECU 20, the target selection unit 105 selects the target acceleration that is eventually used for speed control, through the use of the first target acceleration a1 and the second target acceleration. On the other hand, when the second target acceleration is not calculated by the steering control ECU 20, the first target acceleration a1 is selected as the target acceleration that is eventually used for speed control. The details of the steering control ECU 20 and the target selection unit 105 will be described later.

The speed control unit 106 controls the speed of the vehicle 2 through the use of the target acceleration selected by the target selection unit 105. In concrete terms, the speed control unit 106 triggers the first actuator 30 through the use of the target acceleration. The first actuator 30 is an actuator regarding speed control of the vehicle 2, and includes an engine actuator and a brake actuator.

The engine actuator controls the driving force of the vehicle 2 by changing the amount of air supplied to the engine (e.g., changing the opening degree of a throttle) in accordance with a control signal from the speed control ECU 10. In the case where the vehicle 2 is a hybrid vehicle or an electric vehicle, the engine actuator controls the driving force of a motor as a motive power source.

The brake actuator controls a brake system in accordance with a control signal from the speed control ECU 10, and controls the braking force applied to each wheel of the vehicle. The brake system is, for example, a hydraulic brake system. In the case where the vehicle 2 is further equipped with a regenerative brake system, the brake actuator controls both the hydraulic brake system and the regenerative brake system.

Incidentally, the first acceleration calculation unit 104 determines whether or not the speed $V_S$ of the vehicle 2 recognized by the first running state recognition unit 102 is equal to or lower than a set speed determined in advance by the driver (including a legal speed that is ordered by decree). If the speed $V_S$ of the vehicle 2 is not equal to or lower than the set speed determined in advance by the driver (including the legal speed ordered by decree), the first acceleration calculation unit 104 calculates a target acceleration (a normal target acceleration) such that the speed $V_S$ of the vehicle 2 becomes equal to the set vehicle speed. The target selection unit 105 selects the normal target acceleration as the target acceleration that is eventually used for speed control. Besides, the first acceleration calculation unit 104 determines whether or not the first preceding vehicle exists, based on a recognition result of the first external situation recognition unit 101. If the first preceding vehicle does not exist, the first acceleration calculation unit 104 calculates the target acceleration (the normal target acceleration) such that the speed $V_S$ of the vehicle 2 becomes equal to the set vehicle speed. The target selection unit 105 selects the normal target acceleration as the target acceleration that is eventually used for speed control.

[Configuration Regarding Arbitration of Target Acceleration]

As described above, when the steering control ECU 20 calculates the second target acceleration, the target selection unit 105 carries out arbitration of the target acceleration during a lane change. The configuration of the steering control ECU 20 regarding arbitration of the target acceleration will be described hereinafter.

The steering control ECU 20 is connected to the external sensor 3, the internal sensor 4 and the direction indicator operation portion 5. The steering control ECU 20 is equipped with an ON signal acquisition unit (an acquisition unit) 200, a second external situation recognition unit (a second recognition unit) 201, a second running state recognition unit 202, a path generation unit 203, a second acceleration calculation unit 204 and a steering control unit 206.

The ON signal acquisition unit 200 acquires an ON signal of one of the direction indicators of the vehicle 2. The ON signal acquisition unit 200 acquires an ON signal of the direction indicator for the right direction or an ON signal of the direction indicator for the left direction, which is output from the direction indicator operation portion 5 in accordance with the driver's operation.

When the ON signal of one of the direction indicators is acquired by the ON signal acquisition unit 200, the second external situation recognition unit 201 recognizes a second preceding vehicle running in front of the vehicle 2 in an adjacent lane that is adjacent to the driving lane in a direction indicated by the direction indicator. The adjacent lane is a lane adjacent to the driving lane. The direction indicated by the direction indicator is a direction associated with the ON signal. The direction indicated by the direction indicator is the right direction of the vehicle 2 in the case where the ON signal of the direction indicator for the right direction is acquired, and is the left direction of the vehicle 2 in the case where the ON signal of the direction indicator for the left direction is acquired. The second preceding vehicle is a vehicle running in the adjacent lane, and is a vehicle running in front of the vehicle 2.

The second external situation recognition unit 201 acquires information on an external situation from the external sensor 3. Then, the second external situation recognition unit 201 recognizes the second preceding vehicle based on the acquired information. Recognition consists of identification of a target and acquisition or calculation of information on the target. As a concrete example, the second external situation recognition unit 201 recognizes a preceding vehicle or preceding vehicles and lane borderlines of the adjacent lane based on image information acquired by the camera. Then, the second external situation recognition unit 201 recognizes the preceding vehicle located in the adjacent lane as the second preceding vehicle. Then, the second external situation recognition unit 201 recognizes a relative distance and a relative speed between the vehicle 2 and the second preceding vehicle, based on at least one of the image information and a detection result of the LIDAR.

The running scene shown in FIG. 2 shows a case where an ON signal of the direction indicator for the left direction is acquired during the running of the vehicle 2. In this case, the adjacent lane that is adjacent to the right lane R1 (the driving lane) in the direction indicated by the direction indicator is the left lane R2. Then, the preceding vehicle B running in the left lane R2 is the second preceding vehicle. The second external situation recognition unit 201 recognizes a preceding vehicle B (the second preceding vehicle) running in front of the vehicle 2 in the left lane R2 as the adjacent lane.

The second running state recognition unit 202 acquires the speed $V_S$ of the vehicle 2 based on a detection result of the speed sensor. Incidentally, the second running state recognition unit 202 may acquire the speed $V_S$ of the vehicle 2 from the first running state recognition unit 102.

The second acceleration calculation unit 204 calculates the second target acceleration of the vehicle 2 based on a recognition result of the second preceding vehicle recognized by the second external situation recognition unit 201. The recognition result is information on the running state of the second preceding vehicle, and is, for example, a relative distance $L_B$ and a relative speed $V_{DB}$ between the vehicle 2 and the second preceding vehicle. The second acceleration calculation unit 204 calculates a second target acceleration a2 such that the speed of the vehicle 2 approaches the speed of the second preceding vehicle, while the vehicle 2 moves by a predetermined distance. As an example, the second acceleration calculation unit 204 calculates the second target acceleration of the vehicle 2 such that the speed of the vehicle 2 becomes equal to the speed of the second preceding vehicle, while the vehicle 2 moves by the relative distance $L_B$. Given that $L_B$ denotes a relative distance (an inter-vehicle distance in the same lane) between the vehicle 2 and the second preceding vehicle and that $V_B$ denotes a speed of the second preceding vehicle that is also obtained from the relative speed $V_{DB}$ and the speed $V_S$ of the vehicle 2, the second acceleration calculation unit 204 calculates the second target acceleration a2 through the use of, for example, a mathematical expression 2 shown below.

$$a2=(V_B^2-V_S^2)/2L_B \tag{2}$$

Incidentally, the second acceleration calculation unit 204 determines whether or not the second preceding vehicle exists, based on a recognition result of the second external situation recognition unit 201. If the second preceding vehicle does not exist, the second acceleration calculation unit 204 does not calculate the target acceleration.

Next, the details of the target selection unit 105 of the above-mentioned speed control ECU 10 will be described. The second acceleration calculation unit 204 of the steering control ECU 20 outputs the calculated second target acceleration a2 to the target selection unit 105 of the speed control ECU 10. The target selection unit 105 compares the first target acceleration a1 and the second target acceleration a2 with each other, and carries out arbitration such that a target acceleration that makes the occurrence of abrupt deceleration unlikely is obtained when the vehicle 2 carries out a lane change. In concrete terms, the target selection unit 105 selects the smaller of the first target acceleration a1 and the second target acceleration a2 as the target acceleration during the lane change. Thus, the target acceleration during the lane change becomes equal to the smaller of the first target acceleration a1 and the second target acceleration a2. Incidentally, if the first target acceleration a1 and the second target acceleration a2 are equal to each other, the target selection unit 105 selects the first target acceleration a1 or the second target acceleration a2 as the target acceleration during the lane change.

FIGS. 3A to 3H are views showing various running scenes of the preceding vehicle A (the first preceding vehicle), the preceding vehicle B (the second preceding vehicle) and the vehicle 2. Each of FIGS. 3A to 3H shows arrows behind the preceding vehicle A and the preceding vehicle B. The direction of each of the arrows indicates whether the relative speed is positive or negative, and the size of each of the arrows indicates the magnitude of the relative speed.

Figure 3A:
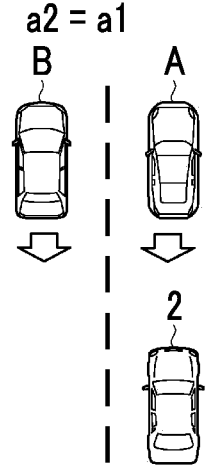
FIG. 3A is a view showing an exemplary running scene of a first preceding vehicle, a second preceding vehicle and the vehicle.

FIG. 3A shows a case where the absolute value of the relative speed between the vehicle 2 and the preceding vehicle A and the absolute value of the relative speed between the vehicle 2 and the preceding vehicle B are equal to each other and both the relative speeds are negative. In this running scene, the first target acceleration a1 and the second target acceleration a2 are equal to each other. The target selection unit 105 selects the first target acceleration a1 or the second target acceleration a2 as a target acceleration during a lane change.

Figure 3D:
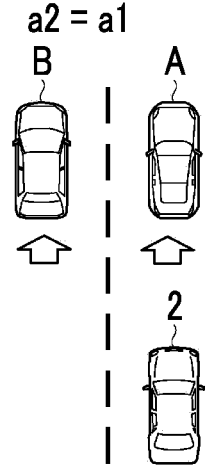
FIG. 3D is a view showing an exemplary running scene of the first preceding vehicle, the second preceding vehicle and the vehicle.
Figure 3G:
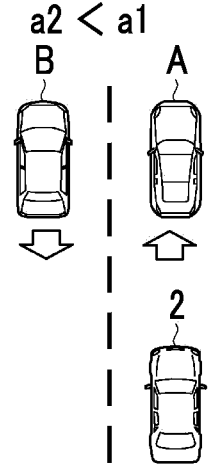
FIG. 3G is a view showing an exemplary running scene of the first preceding vehicle, the second preceding vehicle and the vehicle.
Figure 3B:
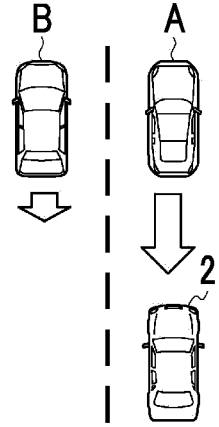
FIG. 3B is a view showing an exemplary running scene of the first preceding vehicle, the second preceding vehicle and the vehicle.

FIG. 3B shows a case where the absolute value of the relative speed between the vehicle 2 and the preceding vehicle A is larger than the absolute value of the relative speed between the vehicle 2 and the preceding vehicle B and both the relative speeds are negative. In this running scene, the first target acceleration a1 is smaller than the second target acceleration a2. The target selection unit 105 selects the first target acceleration a1 as a target acceleration during a lane change.

Figure 3E:
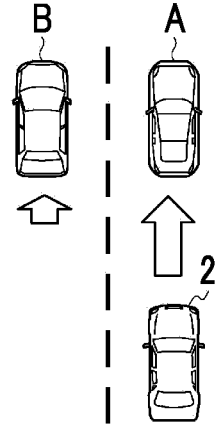
FIG. 3E is a view showing an exemplary running scene of the first preceding vehicle, the second preceding vehicle and the vehicle.
Figure 3H:
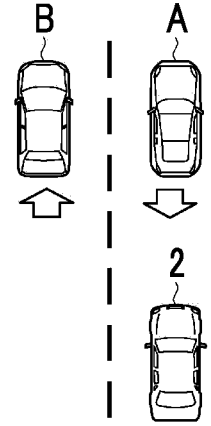
FIG. 3H is a view showing an exemplary running scene of the first preceding vehicle, the second preceding vehicle and the vehicle.
Figure 3C:
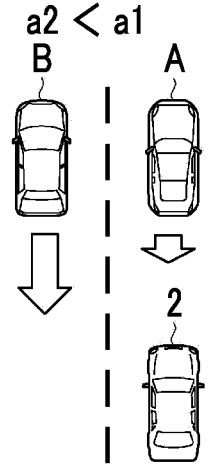
FIG. 3C is a view showing an exemplary running scene of the first preceding vehicle, the second preceding vehicle and the vehicle.

FIG. 3C shows a case where the absolute value of the relative speed between the vehicle 2 and the preceding vehicle A is smaller than the absolute value of the relative speed between the vehicle 2 and the preceding vehicle B and both the relative speeds are negative. In this running scene, the first target acceleration a1 is larger than the second target acceleration a2. The target selection unit 105 selects the second target acceleration a2 as a target acceleration during a lane change.

FIG. 3D shows a case where the absolute value of the relative speed between the vehicle 2 and the preceding vehicle A and the absolute value of the relative speed between the vehicle 2 and the preceding vehicle B are equal to each other and both the relative speeds are positive. In this running scene, the first target acceleration a1 and the second target acceleration a2 are equal to each other. The target selection unit 105 selects the first target acceleration a1 or the second target acceleration a2 as a target acceleration during a lane change.

FIG. 3E shows a case where the absolute value of the relative speed between the vehicle 2 and the preceding vehicle A is larger than the absolute value of the relative speed between the vehicle 2 and the preceding vehicle B and both the relative speeds are positive. In this running scene, the first target acceleration a1 is larger than the second target acceleration a2. The target selection unit 105 selects the second target acceleration a2 as a target acceleration during a lane change.

Figure 3F:
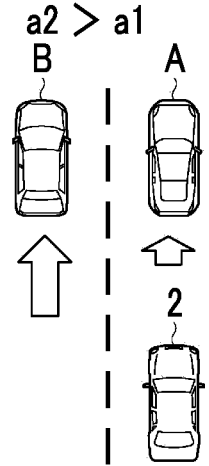
FIG. 3F is a view showing an exemplary running scene of the first preceding vehicle, the second preceding vehicle and the vehicle.

FIG. 3F shows a case where the absolute value of the relative speed between the vehicle 2 and the preceding vehicle A is smaller than the absolute value of the relative speed between the vehicle 2 and the preceding vehicle B and both the relative speeds are positive. In this running scene, the first target acceleration a1 is smaller than the second target acceleration a2. The target selection unit 105 selects the first target acceleration a1 as a target acceleration during a lane change.

FIG. 3G shows a case where the relative speed between the vehicle 2 and the preceding vehicle A is positive and the relative speed between the vehicle 2 and the preceding vehicle B is negative. In this running scene, the first target acceleration a1 is larger than the second target acceleration a2. The target selection unit 105 selects the second target acceleration a2 as a target acceleration during a lane change.

FIG. 3H shows a case where the relative speed between the vehicle 2 and the preceding vehicle A is negative and the relative speed between the vehicle 2 and the preceding vehicle B is positive. In this running scene, the first target acceleration a1 is smaller than the second target acceleration a2. The target selection unit 105 selects the first target acceleration a1 as a target acceleration during a lane change.

As described hitherto, the target selection unit 105 compares the first target acceleration a1 and the second target acceleration a2 with each other, and carries out arbitration such that a target acceleration that makes the occurrence of abrupt deceleration more unlikely is obtained when the vehicle 2 carries out a lane change. Therefore, the speed control unit 106 can perform speed control in which abrupt deceleration is unlikely to occur during a lane change. Besides, according to the foregoing configuration, when the relative speed between the vehicle 2 and the preceding vehicle B is higher than the relative speed between the vehicle 2 and the preceding vehicle A, the first target acceleration a1 is selected as the target acceleration during the lane change. In consequence, the inter-vehicle distance between the vehicle 2 and the preceding vehicle A can be secured in carrying out the lane change. Furthermore, the vehicle 2 may be configured to be accelerated in accordance with the speed of the preceding vehicle B from a time point when part of the vehicle 2 enters the adjacent lane. Owing to this configuration, the vehicle 2 is accelerated at an earlier stage than after the lane change. Therefore, the vehicle can start running in accordance with the speed of the vehicle running in the adjacent lane at an early stage, and the feeling of strangeness developed by the driver at the time of the lane change can be reduced.

[Configuration Regarding Automatic Steering Control]

Next, the configuration regarding automatic steering control of the steering control ECU 20 will be described. The second external situation recognition unit 201 acquires information necessary for automatic steering control from the external sensor 3. The second external situation recognition unit 201 recognizes lane widths of the driving lane and the adjacent lane and the like based on image information acquired by the camera. Furthermore, the second external situation recognition unit 201 recognizes the relative distance $L_A$ and the relative speed $V_{DA}$ between the vehicle 2 and the first preceding vehicle in the driving lane, with a view to determining whether or not a lane change is possible. The second external situation recognition unit 201 recognizes the relative distance $L_A$ and the relative speed $V_{DA}$ between the vehicle 2 and the first preceding vehicle through the same process as executed by the first external situation recognition unit 101. Incidentally, the second external situation recognition unit 201 may acquire the relative distance $L_A$ and the relative speed $V_{DA}$ from the first external situation recognition unit 101.

The second running state recognition unit 202 acquires information corresponding to the running state of the vehicle 2 from the internal sensor 4, as information necessary for automatic steering control. The second running state recognition unit 202 recognizes a lateral position of the vehicle 2, based on image information acquired from the camera. The lateral position is a position of the vehicle 2 (e.g., a position of the center of gravity of the vehicle 2) in a direction perpendicular to the direction in which the lanes extend. Furthermore, the second running state recognition unit 202 acquires the speed $V_S$ of the vehicle 2 based on a detection result of the speed sensor, with a view to determining whether or not a lane change is possible. Incidentally, the second running state recognition unit 202 may acquire the speed $V_S$ of the vehicle 2 from the first running state recognition unit 102.

The path generation unit 203 generates a path (a running locus) P of a lane change from the driving lane to an adjacent lane that is adjacent thereto in a direction indicated by one of the direction indicators. First of all, the path generation unit 203 determines whether or not a lane change is possible, based on a running environment (a lane width) recognized by the second external situation recognition unit 201, a recognition result (a relative distance and a relative speed) of the first preceding vehicle and the second preceding vehicle, and a recognition result (a speed and a lateral position of the vehicle 2) of the second running state recognition unit 202. As an example, the path generation unit 203 determines whether or not a lane change is possible, based on the lane widths of the driving lane and the adjacent lane and changes in positional relationship among the vehicle 2, the first preceding vehicle and the second preceding vehicle with time. As a more concrete example, when it is predicted that an inter-vehicle distance equal to or longer than a predetermined threshold continues to be secured during a lane change, the path generation unit 203 determines that there is a situation where a lane change is possible. If it is determined that there is a situation where a lane change is possible, the path generation unit 203 generates the path P of the lane change according to a geometrical method, within the range of the turning performance of the vehicle 2.

The steering control unit 206 controls the steering of the vehicle 2 through the use of the path P of the lane change generated by the path generation unit 203. The steering control unit 206 triggers the second actuator 40 through the use of the path P. The second actuator 40 is a steering actuator regarding steering control of the vehicle 2. The steering actuator controls the driving of an assist motor of an electric power steering system, which controls a steering torque, in accordance with a control signal from the steering control ECU 20. Thus, the steering actuator controls the steering torque of the vehicle 2. As described hitherto, the steering control ECU 20 carries out a lane change of the vehicle 2 through automatic steering control.

[Automatic Speed Control and Automatic Steering Control]

Figure 4:
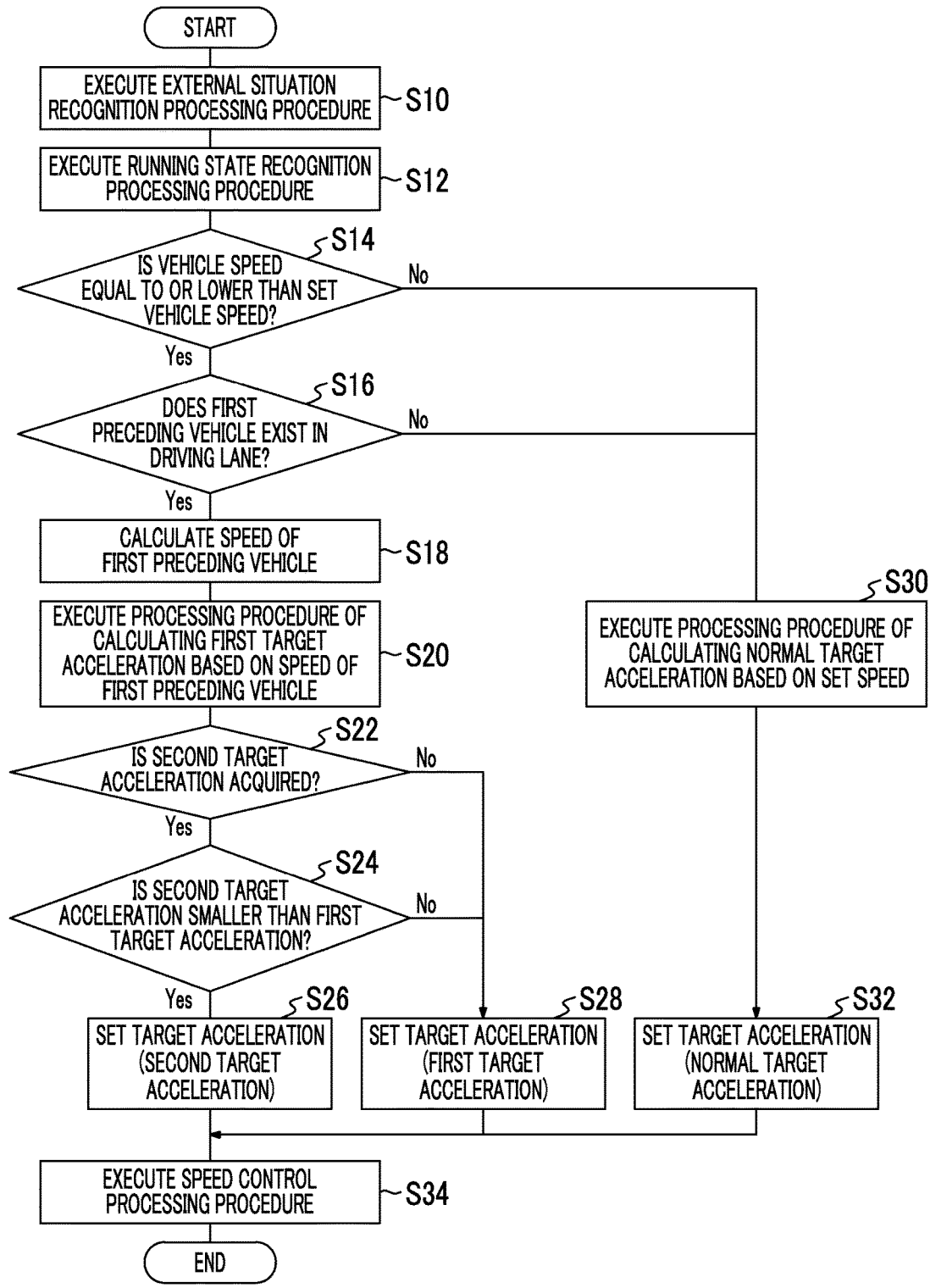
FIG. 4 is a flowchart of an automatic speed control process of the vehicular control apparatus shown in FIG. 1.

Next, an automatic speed control process and an automatic steering control process of the vehicular control apparatus 1 will be described. FIG. 4 is a flowchart of the automatic speed control process of the vehicular control apparatus 1. The flowchart shown in FIG. 4 is started when the driver's command to start automatic speed control is received.

First of all, the first external situation recognition unit 101 of the speed control ECU 10 recognizes an external situation of the vehicle 2 based on information output by the external sensor 3, as an external situation recognition processing procedure (S10). The first external situation recognition unit 101 recognizes a preceding vehicle or preceding vehicles and a driving lane, based on image information acquired by the camera. If the preceding vehicle A exists in the driving lane, the first external situation recognition unit 101 recognizes the preceding vehicle A as the first preceding vehicle. The first external situation recognition unit 101 recognizes the relative distance $L_A$ and the relative speed $V_{DA}$ between the vehicle 2 and the first preceding vehicle, based on at least one of the image information and a detection result of the LIDAR.

Subsequently, the first running state recognition unit 102 of the speed control ECU 10 recognizes a running state of the vehicle 2 based on information output by the internal sensor 4, as a running state recognition processing procedure (S12). The first running state recognition unit 102 recognizes the speed $V_S$ of the vehicle 2 based on a detection result of the speed sensor.

Subsequently, the first acceleration calculation unit 104 of the speed control ECU 10 determines whether or not the speed $V_S$ of the vehicle 2 recognized through the running state recognition processing procedure (S12) is equal to or lower than the set speed determined in advance by the driver (including the legal speed that is ordered by decree), as a speed determination processing procedure (S14). If it is determined that the speed $V_S$ of the vehicle 2 is not equal to or lower than the set speed, the first acceleration calculation unit 104 executes a processing procedure of calculating the normal target acceleration (S30).

The first acceleration calculation unit 104 of the speed control ECU 10 calculates the target acceleration (the normal target acceleration) such that the speed $V_S$ of the vehicle 2 becomes equal to the set speed, as the processing procedure of calculating the normal target acceleration (S30). Subsequently, the target selection unit 105 of the speed control ECU 10 selects the normal target acceleration calculated through the calculation processing procedure (S30) as a target acceleration that is eventually used for speed control, as a target acceleration setting processing procedure (S32). Subsequently, the speed control unit 106 of the speed control ECU 10 controls the speed $V_S$ of the vehicle 2 through the use of the target acceleration selected through the target acceleration setting processing procedure (S32), as a speed control processing procedure (S34). Thus, the speed $V_S$ of the vehicle 2 becomes equal to the set vehicle speed while the vehicle runs to cover a predetermined distance. When the speed control processing procedure (S34) ends, the speed control ECU 10 ends the flowchart shown in FIG. 4. As described hitherto, if the speed $V_S$ of the vehicle 2 is not equal to or lower than the set vehicle, the speed control ECU 10 performs automatic speed control to make the speed $V_S$ of the vehicle 2 coincident with the set vehicle speed.

In the speed determination processing procedure (S14), if it is determined that the speed $V_S$ of the vehicle 2 is equal to or lower than the set speed, the first acceleration calculation unit 104 executes a preceding vehicle determination processing procedure (S16). The first acceleration calculation unit 104 determines whether or not the first preceding vehicle exists, based on a recognition result recognized through the external situation recognition processing procedure (S10). If it is determined that the first preceding vehicle does not exist, the first acceleration calculation unit 104 executes the above-mentioned calculation processing procedure (S30). Then, the target selection unit 105 executes the above-mentioned target acceleration setting processing procedure (S32). The speed control unit 106 executes the speed control processing procedure (S34). Thus, the speed $V_S$ of the vehicle 2 becomes equal to the set vehicle speed while the vehicle runs to cover the predetermined distance. When the speed control processing procedure (S34) ends, the speed control ECU 10 ends the flowchart shown in FIG. 4. As described hitherto, if the speed $V_S$ of the vehicle 2 is equal to or lower than the set vehicle speed and the first preceding vehicle does not exist, the speed control ECU 10 performs automatic speed control to make the speed $V_S$ of the vehicle 2 coincident with the set vehicle speed.

In the preceding vehicle determination processing procedure (S16), if it is determined that the first preceding vehicle exists, the first external situation recognition unit 101 executes a speed calculation processing procedure (S18). The first external situation recognition unit 101 calculates a speed $V_A$ of the first preceding vehicle, through the use of the relative speed $V_{DA}$ recognized through the external situation recognition processing procedure (S10) and the speed $V_S$ of the vehicle 2 recognized through the running state recognition processing procedure (S12), as the speed calculation processing procedure (S18).

Subsequently, the first acceleration calculation unit 104 calculates the first target acceleration a1 through the use of the above-mentioned mathematical expression 1, as a processing procedure of calculating the first target acceleration (S20).

Subsequently, the target selection unit 105 determines whether or not the second target acceleration a2 has been acquired from the steering control ECU 20, as an acquisition determination processing procedure (S22). If it is determined that the second target acceleration a2 has been acquired from the steering control ECU 20, the target selection unit 105 determines whether or not the second target acceleration a2 is smaller than the first target acceleration a1, as a comparison processing procedure (S24). If it is determined that the second target acceleration a2 is smaller than the first target acceleration a1, the target selection unit 105 selects the second target acceleration a2 as the target acceleration that is eventually used for speed control, as a target acceleration setting processing procedure (S26). Subsequently, the speed control unit 106 of the speed control ECU 10 controls the speed $V_S$ of the vehicle 2 through the use of the second target acceleration a2 selected through the target acceleration setting processing procedure (S26), as a speed control processing procedure (S34). Thus, the speed $V_S$ of the vehicle 2 becomes equal to a speed $V_B$ of the second preceding vehicle while the vehicle 2 moves by the relative distance $L_B$. When the speed control processing procedure (S34) ends, the speed control ECU 10 ends the flowchart shown in FIG. 4.

If it is determined in the acquisition determination processing procedure (S22) that the second target acceleration a2 has not been acquired from the steering control ECU 20, and if it is determined in the comparison processing procedure (S24) that the second target acceleration a2 is not smaller than the first target acceleration a1, the target selection unit 105 selects the first target acceleration a1 as the target acceleration that is eventually used for speed control, as a target acceleration setting processing procedure (S28). Subsequently, the speed control unit 106 of the speed control ECU 10 controls the speed $V_S$ of the vehicle 2 through the use of the first target acceleration a1 selected through the target acceleration setting processing procedure (S28), as a speed control processing procedure (S34). Thus, the speed $V_S$ of the vehicle 2 becomes equal to the speed $V_A$ of the first preceding vehicle while the vehicle 2 moves by the relative distance $L_A$. When the speed control processing procedure (S34) ends, the speed control ECU 10 ends the flowchart shown in FIG. 4.

As described hitherto, if the speed $V_S$ of the vehicle 2 is equal to or lower than the set vehicle speed and the first preceding vehicle exists, the speed control ECU 10 performs automatic speed control to make the speed $V_S$ of the vehicle 2 coincident with the lower one of the speed $V_A$ of the first preceding vehicle and the speed $V_B$ of the second preceding vehicle.

When the flowchart shown in FIG. 4 ends, the speed control ECU 10 determines whether or not the driver's command to end automatic speed control has been received. If it is determined that the driver's command to end automatic speed control has not been received, the speed control ECU 10 starts the flowchart shown in FIG. 4 from scratch. If it is determined that the driver's command to end automatic speed control has been received, the speed control ECU 10 ends the process without executing the flowchart shown in FIG. 4.

Figure 5:
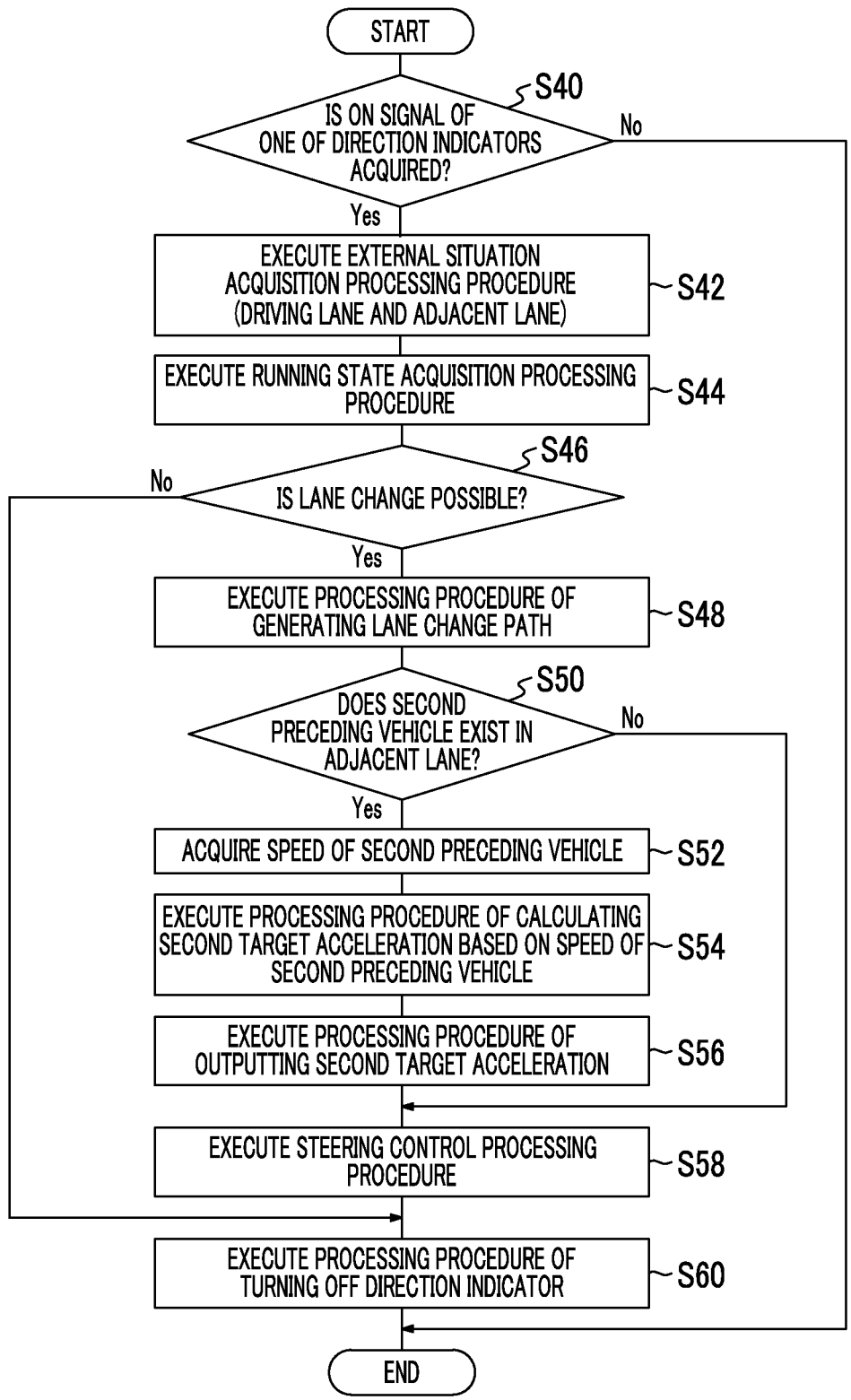
FIG. 5 is a flowchart of the automatic speed control process of the vehicular control apparatus shown in FIG. 1.

Next, the automatic steering control process of the vehicular control apparatus 1 during automatic speed control will be described. FIG. 5 is a flowchart showing the automatic steering control process of the vehicular control apparatus 1. The flowchart shown in FIG. 5 is started when the driver's command to start automatic steering control is received during automatic speed control (i.e., during the execution of the flowchart of FIG. 4).

First of all, the second external situation recognition unit 201 of the steering control ECU 20 determines whether or not an ON signal of one of the direction indicators of the vehicle 2 has been acquired by the ON signal acquisition unit 200, as a signal acquisition determination processing procedure (S40). If it is determined that the ON signal of one of the direction indicators of the vehicle 2 has not been acquired, the flowchart shown in FIG. 5 ends.

If it is determined that the ON signal of one of the direction indicators of the vehicle 2 has been acquired, the second external situation recognition unit 201 of the steering control ECU 20 executes an external situation recognition processing procedure (S42). The second external situation recognition unit 201 recognizes an external situation through the use of a detection result of the external sensor 3, as the external situation recognition processing procedure (S42). The second external situation recognition unit 201 recognizes a lane borderline between the driving lane and the adjacent lane and lane widths thereof, based on image information acquired by the camera. Then, the second external situation recognition unit 201 recognizes the preceding vehicle A located in the driving lane as the first preceding vehicle, and the preceding vehicle B located in the adjacent lane as the second preceding vehicle. Then, the second external situation recognition unit 201 recognizes the relative distance $L_A$ and the relative speed $V_{DA}$ from the first preceding vehicle, and the relative distance $L_B$ and the relative speed $V_{DB}$ from the second preceding vehicle, based on at least one of the image information and a detection result of the LIDAR.

Subsequently, the second running state recognition unit 202 acquires the speed $V_S$ of the vehicle 2 based on a detection result of the speed sensor, as a running state recognition processing procedure (S44). Furthermore, the second running state recognition unit 202 recognizes a lateral position of the vehicle 2 based on image information acquired by the camera.

Subsequently, the path generation unit 203 of the steering control ECU 20 determines whether or not a lane change is possible, based on the lane widths recognized through the external situation recognition processing procedure (S42), the relative distance and relative speed between the first preceding vehicle and the second preceding vehicle, and the speed and lateral position of the vehicle 2 recognized through the running state recognition processing procedure (S44), as a lane change possibility determination processing procedure (S46). If it is determined that a lane change is not possible, the steering control ECU 20 outputs an OFF signal of one of the direction indicators as a direction indicator OFF processing procedure (S60). When the direction indicator OFF processing procedure (S60) ends, the flowchart shown in FIG. 5 ends.

If it is determined in the lane change possibility processing procedure (S46) that a lane change is possible, the path generation unit 203 generates the path P of the lane change according to a geometrical method within the range of the turning performance of the vehicle 2, as a path generation processing procedure (S48).

Subsequently, the second acceleration calculation unit 204 determines whether or not the second preceding vehicle exists based on the recognition result recognized through the external situation recognition processing procedure (S42), as a preceding vehicle determination processing procedure (S50). If it is determined that the second preceding vehicle does not exist, the second acceleration calculation unit 204 does not calculate the target acceleration. Then, the steering control unit 206 controls the steering of the vehicle 2 through the path P of the lane change generated through the path generation processing procedure (S48), as a steering control processing procedure (S58). Then, the steering control ECU 20 outputs an OFF signal of one of the direction indicators, as the direction indicator OFF processing procedure (S60). When the direction indicator OFF processing procedure (S60) ends, the flowchart shown in FIG. 5 ends.

If it is determined in the preceding vehicle determination processing procedure (S50) that the second preceding vehicle exists, the second external situation recognition unit 201 executes a speed calculation processing procedure (S52). The second external situation recognition unit 201 calculates the speed $V_B$ of the second preceding vehicle, through the use of the relative speed $V_{DB}$ recognized through the external situation recognition processing procedure (S42) and the speed $V_S$ of the vehicle 2 recognized through the running state recognition processing procedure (S44), as the speed calculation processing procedure (S52).

Subsequently, the second acceleration calculation unit 204 calculates the second target acceleration a2 through the use of the above-mentioned mathematical expression 2, as a processing procedure of calculating the second target acceleration (S54). Then, the second acceleration calculation unit 204 outputs the second target acceleration a2 calculated through the calculation processing procedure (S54), as a processing procedure of outputting the second target acceleration (S56). Then, the steering control unit 206 controls the steering of the vehicle 2 through the use of the path P of the lane change generated through the path generation processing procedure (S48), as the steering control processing procedure (S58). Then, the steering control ECU 20 outputs an OFF signal of one of the direction indicators, as the direction indicator OFF processing procedure (S60). When the direction indicator OFF processing procedure (S60) ends, the flowchart shown in FIG. 5 is ended.

When the flowchart shown in FIG. 5 ends, the steering control ECU 20 determines whether or not the driver's command to end automatic steering control has been received. If it is determined that the driver's command to end automatic steering control has not been received, the steering control ECU 20 starts the flowchart shown in FIG. 5 from scratch. If it is determined that the driver's command to end automatic steering control has been received, the steering control ECU 20 ends the process without executing the flowchart shown in FIG. 5.

Figure 6:
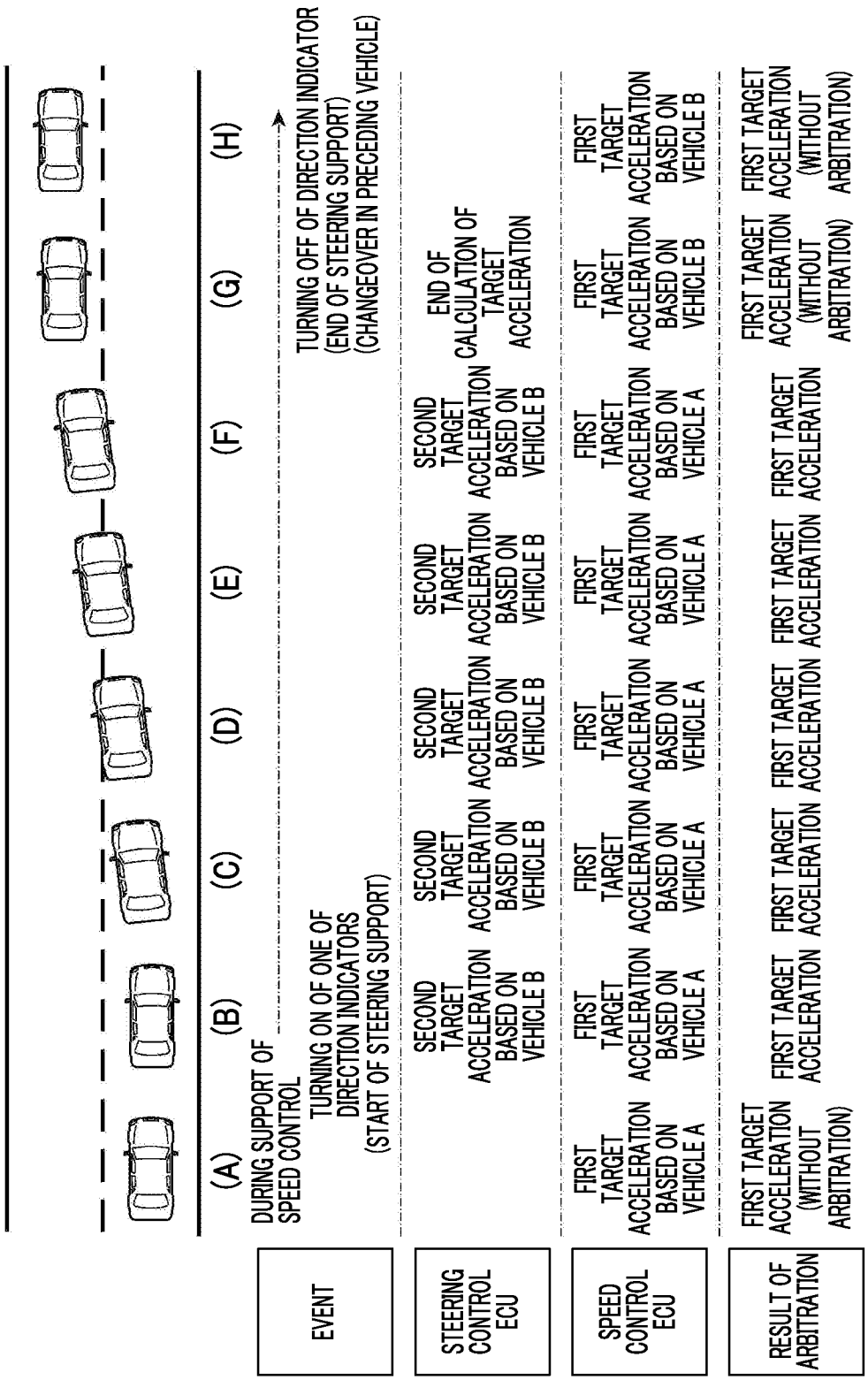
FIG. 6 is a view illustrating arbitration of a running position of the vehicle and a target acceleration thereof in the case where a target acceleration based on a preceding vehicle A is smaller than a target acceleration based on a preceding vehicle B.

The automatic speed control process and the automatic steering control process are executed in parallel according to the flowcharts shown in FIGS. 4 and 5. A result obtained by executing the flowcharts will be described hereinafter using the drawings. FIG. 6 is a view illustrating arbitration of the running position of the vehicle 2 and the target acceleration thereof, in the case where the target acceleration based on the preceding vehicle A is smaller than the target acceleration based on the preceding vehicle B. As shown in FIG. 6, the vehicle 2 runs past running positions (A) to (H). At each of the running positions, automatic speed control is performed by the speed control ECU 10. Besides, the preceding vehicle A and the preceding vehicle B are omitted. The result of arbitration at each of the running positions will be described hereinafter.

At the running position (A), the direction indicators have not been turned ON. At the running position (A), the speed control ECU 10 calculates the first target acceleration a1 targeting the preceding vehicle A (the first preceding vehicle). The steering control ECU 20 does not calculate the second target acceleration a2, because the direction indicators have not been turned ON yet. Therefore, the speed control ECU 10 does not carry out arbitration, and the first target acceleration a1 is identified with an eventual target acceleration that is used for automatic speed control.

At the running position (B), one of the direction indicators is turned ON. At the running position (B), the speed control ECU 10 calculates the first target acceleration a1 targeting the preceding vehicle A (the first preceding vehicle). The steering control ECU 20 calculates the second target acceleration a2 targeting the preceding vehicle B (the second preceding vehicle). The first target acceleration a1 is smaller than the second target acceleration a2. Therefore, the first target acceleration a1 is identified with the eventual target acceleration that is used for automatic speed control, through arbitration carried out by the speed control ECU 10.

The same as at the running position (B) holds true at the running positions (C) to (F). Automatic speed control is performed through the use of the first target acceleration a1 by the speed control ECU 10, and automatic steering control is performed by the steering control ECU 20. Thus, the vehicle 2 automatically carries out a lane change. At the running position (G), the steering control ECU 20 determines that the vehicle 2 has reached a target lateral position, and ends steering control. Therefore, at the running position (G), the steering control ECU 20 does not calculate the second target acceleration a2. The speed control ECU 10 determines that the driving lane of the vehicle 2 has been changed, and recognizes the preceding vehicle B as the first preceding vehicle (a changeover in preceding vehicle has occurred). Thus, the speed control ECU 10 calculates the first target acceleration a1 based on the preceding vehicle B. Therefore, the speed control ECU 10 does not carry out arbitration, and the first target acceleration a1 is identified with the eventual target acceleration that is used for automatic speed control. The same as at the running position (A) holds true at the running position (H), and the first target acceleration a1 is identified with the eventual target acceleration that is used for automatic speed control. Besides, the period from departure of the vehicle 2 from the running position (C) to arrival of the vehicle 2 at the running position (G) may be identified with a lane change period.

As described hitherto, when the target acceleration based on the preceding vehicle A running in the driving lane is smaller than the target acceleration based on the preceding vehicle B running in the adjacent lane, the vehicle 2 is controlled at the first target acceleration a1 based on the preceding vehicle A running in the driving lane before and during a lane change, and the vehicle 2 is controlled at the first target acceleration a1 based on the preceding vehicle B running in the driving lane after the completion of the lane change.

Figure 7:
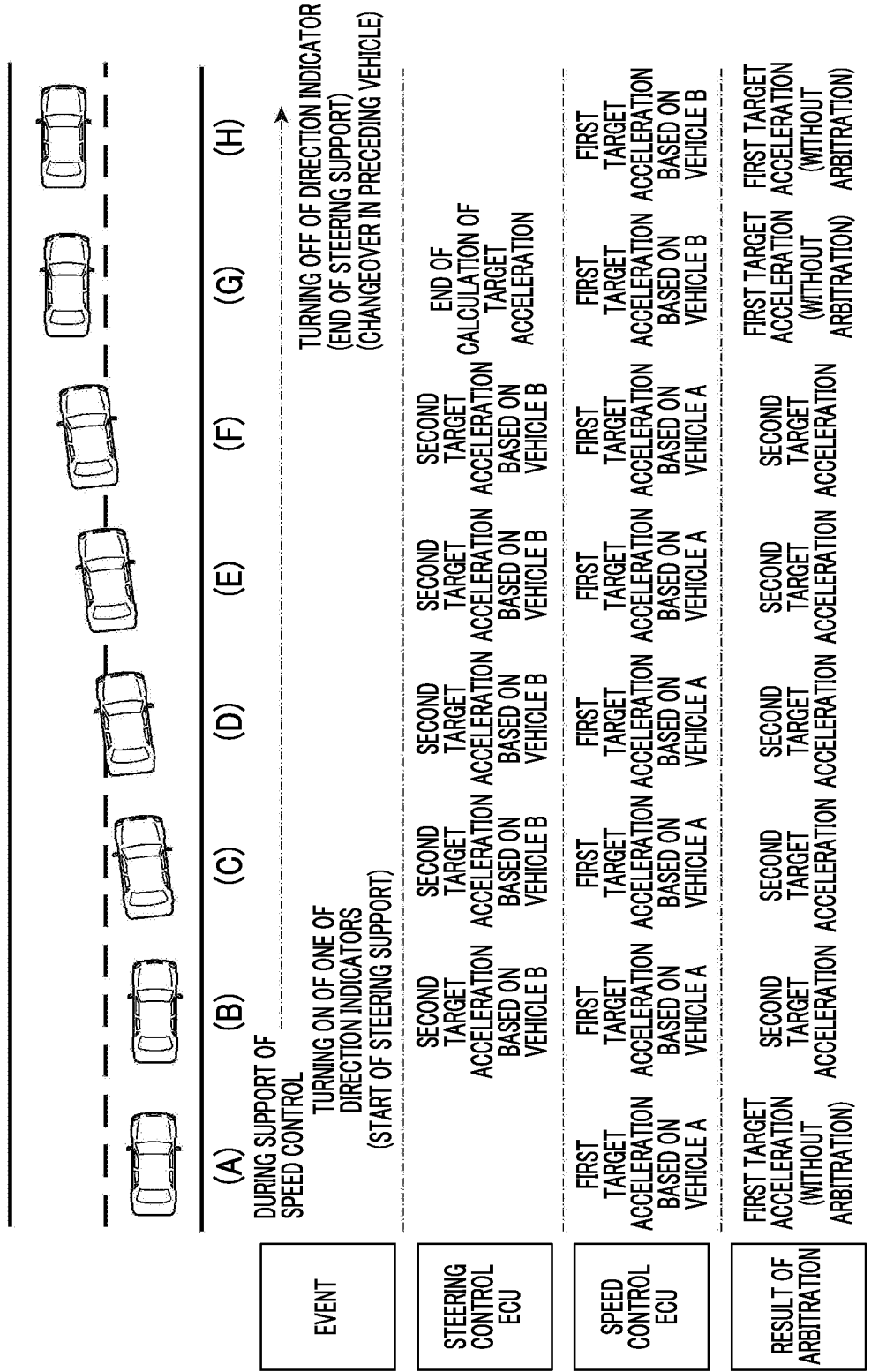
FIG. 7 is a view illustrating arbitration of the running position of the vehicle and the target acceleration thereof in the case where the target acceleration based on the preceding vehicle A is larger than the target acceleration based on the preceding vehicle B.

FIG. 7 is a view illustrating arbitration of the running position and target acceleration of the vehicle 2 in the case where the target acceleration based on the preceding vehicle A is larger than the target acceleration based on the preceding vehicle B. As shown in FIG. 7, the vehicle 2 runs past the running positions (A) to (H). At each of the running positions, automatic speed control is performed by the speed control ECU 10. Besides, the preceding vehicle A and the preceding vehicle B are omitted. A result of arbitration at each of the running positions will be described hereinafter.

At the running position (A), the direction indictors have not been turned ON. At the running position (A), the speed control ECU 10 calculates the first target acceleration a1 targeting the preceding vehicle A (the first preceding vehicle). The steering control ECU 20 does not calculate the second target acceleration a2, because the direction indicators have not been turned ON yet. Therefore, the speed control ECU 10 does not carry out arbitration, and the first target acceleration a1 is identified with the eventual target acceleration that is used for automatic speed control.

At the running position (B), one of the direction indicators is turned ON. At the running position (B), the speed control ECU 10 calculates the first target acceleration a1 targeting the preceding vehicle A (the first preceding vehicle). The steering control ECU 20 calculates the second target acceleration a2 targeting the preceding vehicle B (the second preceding vehicle). The first target acceleration a1 is larger than the second target acceleration a2. Therefore, the second target acceleration a2 is identified with the eventual target acceleration that is used for automatic speed control, through arbitration carried out by the speed control ECU 10.

The same as at the running position (B) holds true at the running positions (C) to (F). Automatic speed control is performed through the use of the second target acceleration a2 by the speed control ECU 10, and automatic steering control is performed by the steering control ECU 20. Thus, the vehicle 2 automatically carries out a lane change. At the running position (G), the steering control ECU 20 determines that the vehicle 2 has reached the target lateral position, and ends steering control. Therefore, at the running position (G), the steering control ECU 20 does not calculate the second target acceleration a2. The speed control ECU 10 determines that the driving lane of the vehicle 2 has been changed, and recognizes the preceding vehicle B as the first preceding vehicle (a changeover in preceding vehicle has occurred). Thus, the speed control ECU 10 calculates the first target acceleration a1 based on the preceding vehicle B. Therefore, the speed control ECU 10 does not carry out arbitration, and the first target acceleration a1 is identified with the eventual target acceleration that is used for automatic speed control. The same as at the running position (A) holds true at the running position (H), and the first target acceleration a1 is identified with the eventual target acceleration that is used for automatic speed control.

As described hitherto, when the target acceleration based on the preceding vehicle A running in the driving lane is larger than the target acceleration based on the preceding vehicle B running in the adjacent lane, the vehicle 2 is controlled at the first target acceleration a1 based on the preceding vehicle A running in the driving lane or the preceding vehicle B before and after a lane change, and the vehicle 2 is controlled at the second target acceleration a2 based on the preceding vehicle B running in the adjacent lane during the lane change.

As described hitherto, in the vehicular control apparatus 1 according to the first embodiment of the disclosure, the first target acceleration a1 of the vehicle 2 is calculated based on the speed $V_A$ of the preceding vehicle A (the first preceding vehicle) running in the driving lane by the first acceleration calculation unit 104. When the ON signal of one of the direction indicators is acquired by the ON signal acquisition unit 200, the second target acceleration a2 of the vehicle 2 is calculated based on the speed $V_B$ of the preceding vehicle B (the second preceding vehicle) running in the adjacent lane by the second acceleration calculation unit 204. Then, the smaller of the first target acceleration a1 and the second target acceleration a2 is selected as the target acceleration during the lane change by the target selection unit 105.

Figure 8:
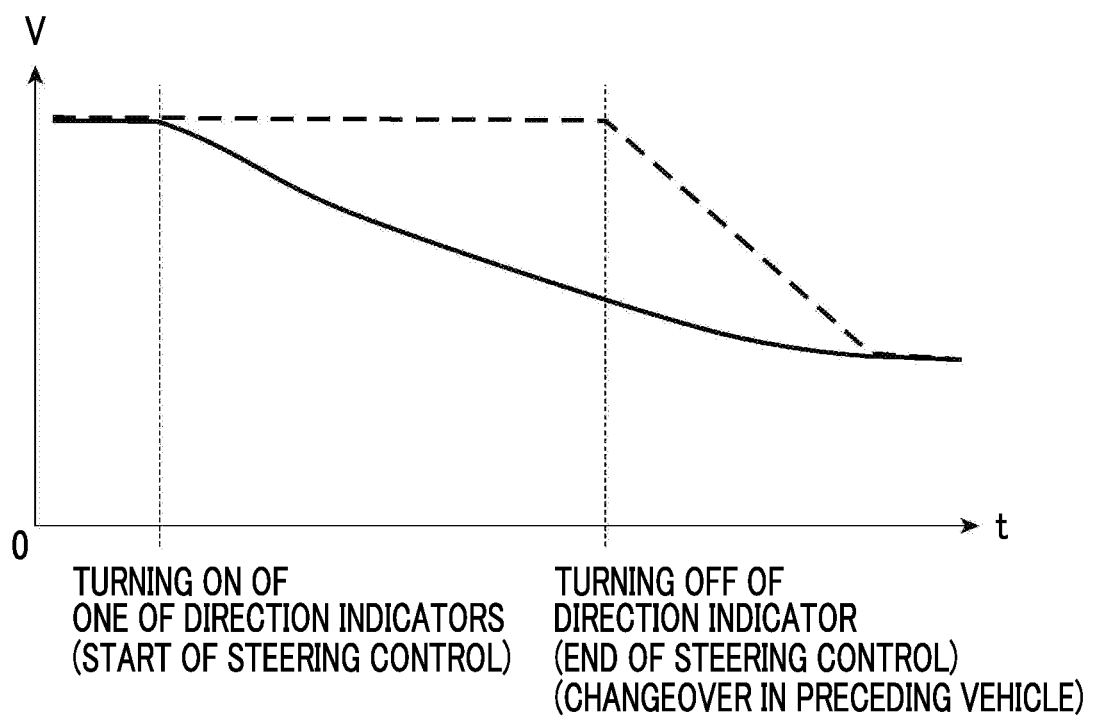
FIG. 8 is a view illustrating changes in speed of the vehicle with time during a lane change.

FIG. 8 is a view illustrating changes in the speed of the vehicle 2 with time during a lane change. FIG. 8 shows a graph exemplifying a case where the preceding vehicle B (the second preceding vehicle) running in the adjacent lane is slower than the preceding vehicle A (the first preceding vehicle) targeted by speed control. The axis of abscissa represents time, and the axis of ordinate represents the speed of the vehicle 2. A broken line in the graph indicates changes in speed with time in general automatic speed control. As indicated by the broken line in the graph, in general automatic speed control, speed control is always performed based on the preceding vehicle in the driving lane. Therefore, when the lane change ends, a rapid changeover in preceding vehicle to the preceding vehicle running at the lower speed is made, and abrupt deceleration occurs. In contrast, a solid line in the graph indicates changes in speed with time when the second target acceleration a2, namely, the smaller of the first target acceleration a1 and the second target acceleration a2 is selected as the target acceleration during the lane change. As indicated by the solid line in the graph, when the target acceleration during the lane change is set to the second target acceleration a2 based on the preceding vehicle B (the second preceding vehicle) running in the adjacent lane, the vehicle can start running with reference to the preceding vehicle B (the second preceding vehicle) at an earlier stage than when the target acceleration is set to the first target acceleration a1 (indicated by the broken line in the graph). Therefore, as indicated by the solid line in the graph of FIG. 8, the vehicle can be smoothly decelerated while suppressing the occurrence of abrupt deceleration. In consequence, the riding comfort of the driver can be enhanced.

Second Embodiment

A vehicular control apparatus 1A according to the second embodiment of the disclosure performs automatic speed control of the vehicle 2 in the case where a lane change is carried out manually instead of being carried out through automatic steering control. The vehicular control apparatus 1A according to the second embodiment of the disclosure is different from the vehicular control apparatus 1 according to the first embodiment of the disclosure in that the steering control ECU 20 is not provided and that a speed control ECU 10A is obtained by adding some of the functions of the steering control ECU 20 to the speed control ECU 10. The following description will be given focusing on what is different from the vehicular control apparatus 1 according to the first embodiment of the disclosure, and redundant description will be omitted.

Figure 9:
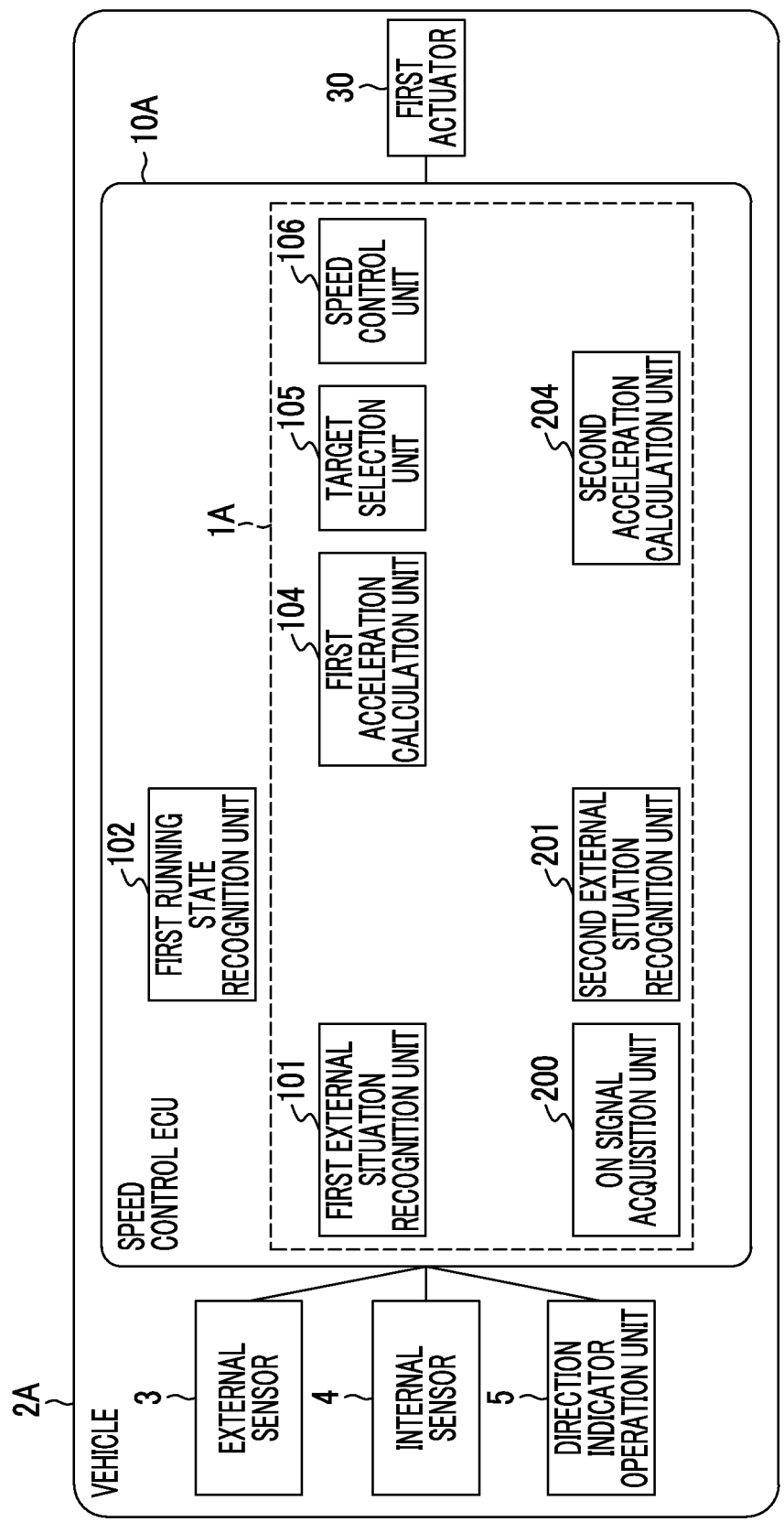
FIG. 9 is a block diagram illustrating the configuration of a vehicle that is equipped with a vehicular control apparatus according to the second embodiment of the disclosure.

FIG. 9 is a block diagram illustrating the configuration of a vehicle 2A that is equipped with the vehicular control apparatus 1A according to the second embodiment of the disclosure. The speed control ECU 10A is different from the speed control ECU 10 in that the speed control ECU 10A is connected to the direction indicator operation portion 5 and is equipped with the ON signal acquisition unit 200, the second external situation recognition unit 201 and the second acceleration calculation unit 204. The speed control ECU 10A is identical to the speed control ECU 10 in the other configurational details. The ON signal acquisition unit 200, the second external situation recognition unit 201 and the second acceleration calculation unit 204 are the same as in the first embodiment of the disclosure.

Figure 10:
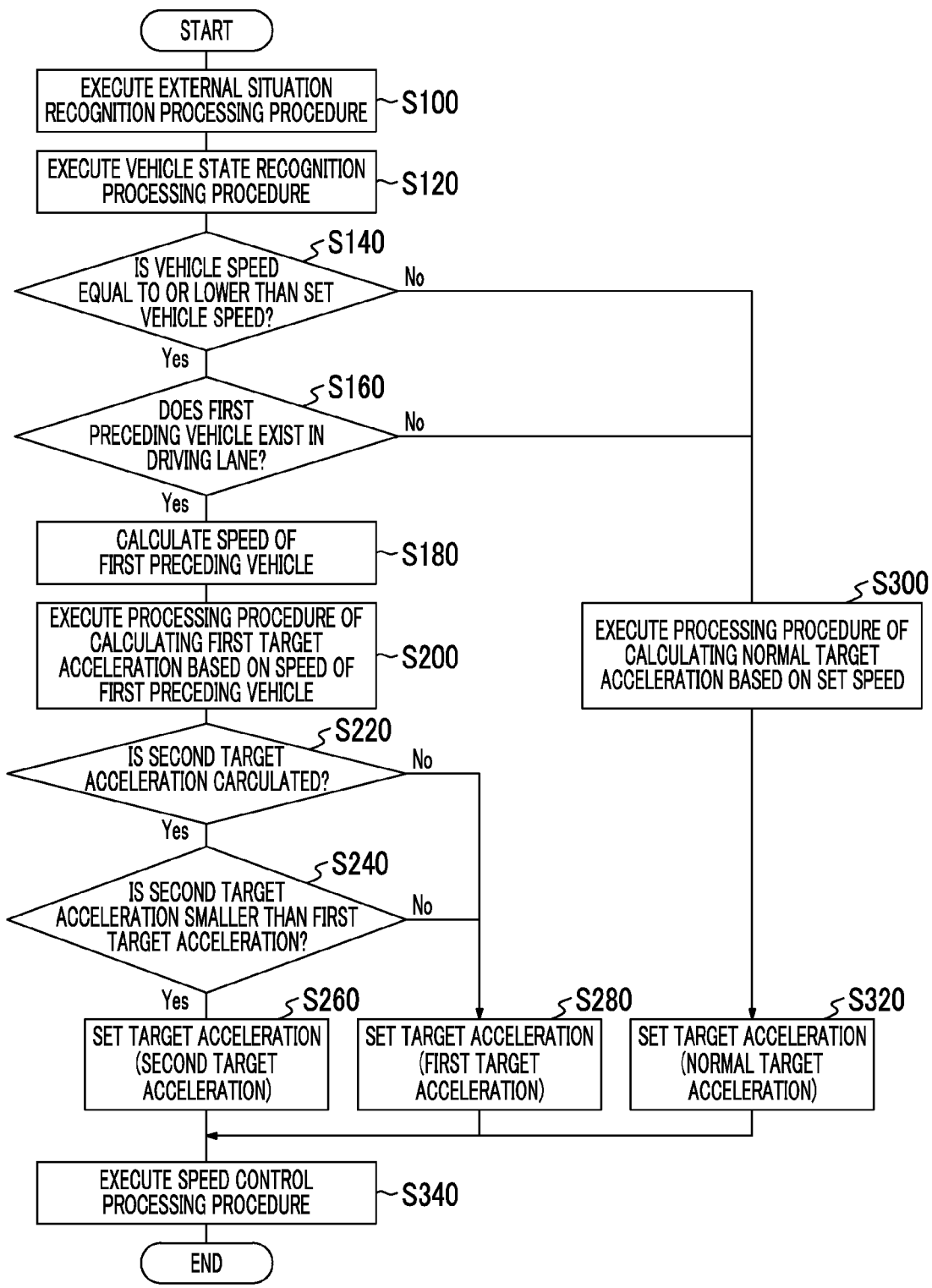
FIG. 10 is a flowchart of a speed control process of the vehicular control apparatus shown in FIG. 9.

Next, the automatic speed control process of the vehicular control apparatus 1A will be described. FIG. 10 is a flowchart showing the automatic speed control process of the vehicular control apparatus 1A. The flowchart shown in FIG. 10 is started when the driver's command to start automatic speed control is received.

An external situation recognition processing procedure (S100), a running state recognition processing procedure (S120), a speed determination processing procedure (S140), a preceding vehicle determination processing procedure (S160), a speed calculation processing procedure (S180), a processing procedure of calculating a first target acceleration (S200), a comparison processing procedure (S240), a target acceleration setting processing procedure (S260), a target acceleration setting processing procedure (S280), a processing procedure of calculating a normal target acceleration (S300), a target acceleration setting processing procedure (S320) and a speed control processing procedure (S340) shown in FIG. 10 are identical to the external situation recognition processing procedure (S10), the running state recognition processing procedure (S12), the speed determination processing procedure (S14), the preceding vehicle determination processing procedure (S16), the speed calculation processing procedure (S18), the processing procedure of calculating the first target acceleration (S20), the comparison processing procedure (S24), the target acceleration setting processing procedure (S26), the target acceleration setting processing procedure (S28), the processing procedure of calculating the normal target acceleration (S30), the target acceleration setting processing procedure (S32) and the speed control processing procedure (S34) shown in FIG. 4, respectively.

Figure 11:
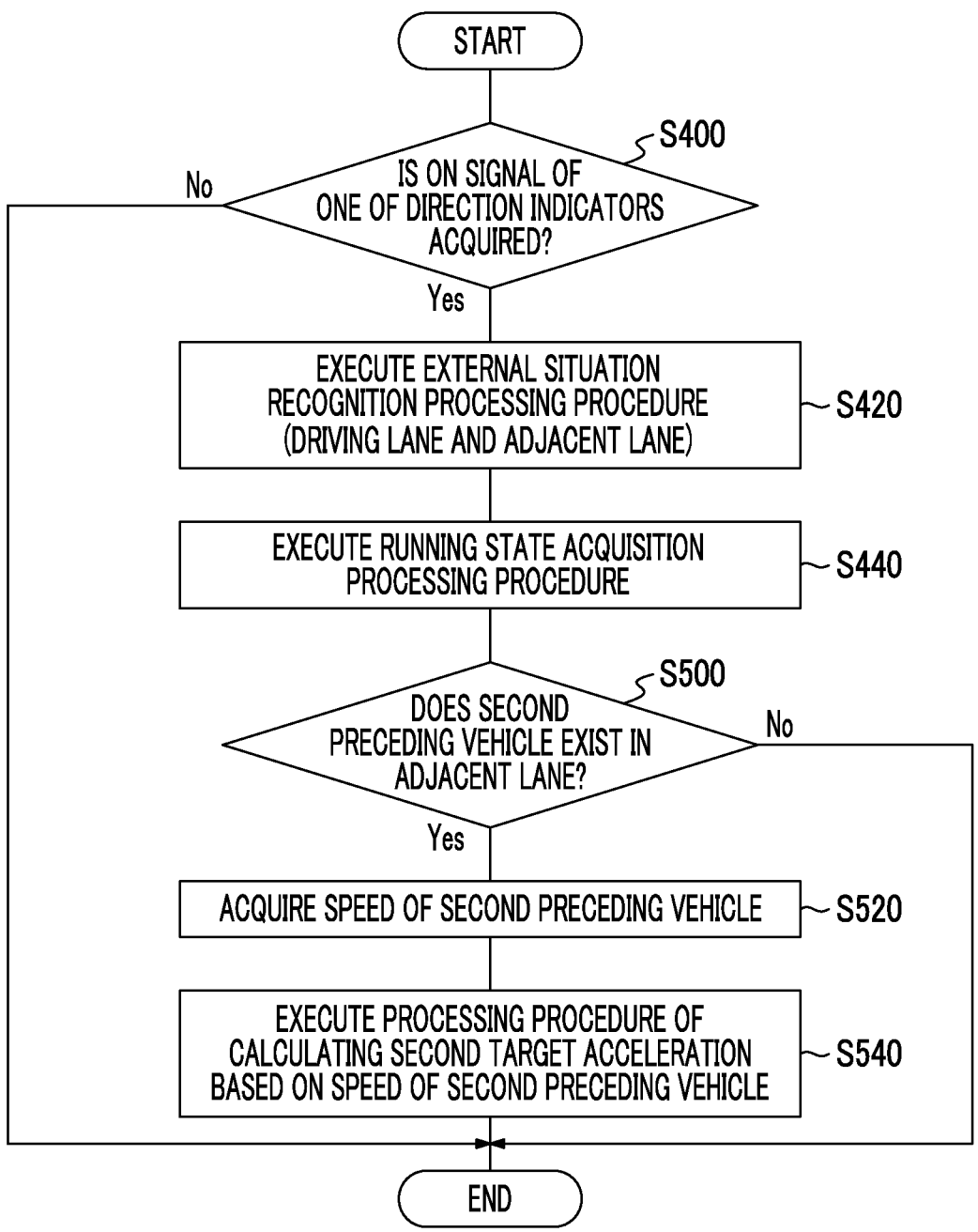
FIG. 11 is a flowchart of a process of calculating a second target acceleration by the vehicular control apparatus shown in FIG. 9.

A calculation determination processing procedure (S220) shown in FIG. 10 is different from the acquisition determination processing procedure (S22) according to the first embodiment of the disclosure in that the speed control ECU 10 calculates and makes a determination on the second target acceleration. FIG. 11 is a flowchart of a process of calculating the second target acceleration by the vehicular control apparatus 1A.

A signal acquisition determination processing procedure (S400), an external situation recognition processing procedure (S420), a running state recognition processing procedure (S440), a preceding vehicle determination processing procedure (S500), a speed calculation processing procedure (S520) and a processing procedure of calculating the second target acceleration (S540) shown in FIG. 11 are different from the signal acquisition determination processing procedure (S40), the external situation recognition processing procedure (S42), the running state recognition processing procedure (S44), the preceding vehicle determination processing procedure (S50), the speed calculation processing procedure (S52) and the processing procedure of calculating the second target acceleration (S54) respectively only in that the operating subject is the speed control ECU 10, and are identical thereto respectively in the other respects.

As described hitherto, in the vehicular control apparatus 1A according to the second embodiment of the disclosure, the first target acceleration a1 of the vehicle 2 is calculated based on the speed $V_A$ of the preceding vehicle A (the first preceding vehicle) running in the driving lane by the first acceleration calculation unit 104. When the ON signal of one of the direction indicators is acquired by the ON signal acquisition unit 200, the second target acceleration a2 of the vehicle 2 is calculated based on the speed $V_B$ of the preceding vehicle B (the second preceding vehicle) running in the adjacent lane by the second acceleration calculation unit 204. Then, the smaller of the first target acceleration a1 and the second target acceleration a2 is selected as a target acceleration during a lane change through manual operation by the target selection unit 105. Therefore, when the vehicle 2 that is subjected to automatic speed control targeting the preceding vehicle A (the first preceding vehicle) running in front of the vehicle 2 in the driving lane carries out a lane change through manual operation to the adjacent lane in which the preceding vehicle B (the second preceding vehicle) exists, the occurrence of abrupt deceleration can be suppressed.

The disclosure can be carried out based on the above-mentioned embodiments thereof, in a variety of modes subjected to various modifications and improvements based on the knowledge of those skilled in the art.

Modification Examples

The speed control ECU 10 and the steering control ECU 20 in the above-mentioned first embodiment of the disclosure do not need to be functionally divided, but may be configured as a single ECU. Alternatively, the functions of the speed control ECU 10 and the steering control ECU 20 may be realized by a plurality of ECU's. Besides, in each of the above-mentioned embodiments of the disclosure, the external sensor 3 is not limited to the LIDAR, but may be a radar that outputs microwaves or the like. Besides, the vehicle 2 may be equipped with a LIDAR as the external sensor 3, a camera and a LIDAR at the same time.

In each of the above-mentioned embodiments of the disclosure, when the vehicle is equipped with a regenerative brake system, the brake actuator may control both the hydraulic brake system and the regenerative brake system.

In each of the above-mentioned embodiments of the disclosure, the example in which the first acceleration calculation unit 104 calculates the first target acceleration a1 through the use of the mathematical expression 1 has been described, but other methods may be used. In each of the above-mentioned embodiments of the disclosure, the example in which the second acceleration calculation unit 204 calculates the second target acceleration a2 through the use of the mathematical expression 2 has been described, but other methods may be used. The first acceleration calculation unit 104 and the second acceleration calculation unit 204 may not adopt a common calculation method. Incidentally, in the case where a target acceleration is used, the speed control ECU 10 can perform computation using a relative distance in comparison with the case where a target speed is calculated to be compared.

Besides, in each of the above-mentioned embodiments of the disclosure, the example in which the speed control unit 106 decelerates the vehicle has been mainly described. However, the disclosure is also applicable to a case where the vehicle is smoothly accelerated in such a manner as to suppress abrupt acceleration.

Besides, in each of the above-mentioned embodiments of the disclosure, the example in which the process regarding automatic speed control and the process regarding automatic steering control during the lane change are executed by acquiring the ON signal of one of the direction indicators has been described, but other methods may be used. For example, information on the direction of the lane change may be acquired by recognizing that the driver has operated a steering wheel. Besides, information on the direction of the lane change may be acquired through the use of an in-vehicle speech recognition system. Besides, information on the direction of the lane change may be acquired by acquiring course information from a car navigation system.

Besides, in each of the above-mentioned embodiments of the disclosure, the example in which the second target acceleration a2 is calculated when the ON signal of one of the direction indicators is acquired has been described, but other methods may be used. For example, the second external situation recognition unit 201 may be configured to recognize a preceding vehicle running in the adjacent lane based on the information acquired from the external sensor 3 even in the case where information on the direction of the lane change is not acquired.

What is claimed is:

1. A vehicular control apparatus comprising:
at least one electronic control unit including a processor, programmed to:
recognize a first preceding vehicle running in front of a vehicle in a driving lane in which the vehicle is running,
calculate a first target acceleration of the vehicle based on a recognition result of the recognized first preceding vehicle,
recognize a second preceding vehicle running in front of the vehicle in a lane located adjacent to the driving lane,
calculate a second target acceleration of the vehicle based on a recognition result of the recognized second preceding vehicle,
acquire lane change information indicating a direction in which the vehicle carries out a lane change,
select the smaller of the first target acceleration and the second target acceleration as a target acceleration of the vehicle in a lane change period at a time when the second preceding vehicle exists in an adjacent lane, the adjacent lane being located adjacent to the driving lane in the direction indicated by the lane change information as viewed from the driving lane, wherein the lane change period is a period from departure of the vehicle from a running position in the driving lane to arrival of the vehicle in a running position in the adjacent lane, and
control a speed of the vehicle in the lane change period by using the selected target acceleration; and
at least one actuator configured to control the speed of the vehicle by receiving a signal from the at least one electronic control unit.

2. The vehicular control apparatus according to claim 1, wherein
the at least one electronic control unit is further programmed to recognize the second preceding vehicle in the adjacent lane, when the lane change information is acquired.

3. The vehicular control apparatus according to claim 1, wherein
the at least one electronic control unit is further programmed to generate a running locus when the vehicle runs from the driving lane to the adjacent lane, and to control steering of the vehicle based on the running locus.

4. The vehicular control apparatus according to claim 1, wherein
the at least one electronic control unit is further programmed to set the second target acceleration as the target acceleration of the vehicle in the lane change period at a time when the second target acceleration is smaller than the first target acceleration.

5. The vehicular control apparatus according to claim 1, wherein
the at least one electronic control unit is further programmed to set the first target acceleration as the target acceleration of the vehicle in the lane change period at a time when the second target acceleration is larger than the first target acceleration.

6. The vehicular control apparatus according to claim 1, wherein
the at least one electronic control unit is further programmed to calculate the first target acceleration based on a first relative distance between the vehicle and the first preceding vehicle, and a first relative speed between the vehicle and the first preceding vehicle, and calculate the second target acceleration based on a second relative distance between the vehicle and the second preceding vehicle, and a second relative speed between the vehicle and the second preceding vehicle.

7. The vehicular control apparatus according to claim 6, wherein
the at least one electronic control unit is further programmed to calculate an acceleration required to make the speed of the vehicle equal to a speed of the first preceding vehicle while the vehicle moves by the relative distance from the first preceding vehicle, as the first target acceleration, and to calculate an acceleration required to make the speed of the vehicle equal to a speed of the second preceding vehicle while the vehicle moves by the relative distance from the second preceding vehicle, as the second target acceleration.

8. The vehicular control apparatus according to claim 2, wherein
the at least one electronic control unit is further programmed to acquire an ON signal of a direction indicator mounted in the vehicle, as the lane change information.

9. The vehicular control apparatus according to claim 1, wherein
the at least one electronic control unit is further programmed to control the speed of the vehicle, by using the target acceleration, at least from a time point when the lane change information is acquired to a time point when the second preceding vehicle is recognized as a preceding vehicle running in a same lane where the vehicle exists.

10. The vehicular control apparatus according to claim 5, wherein
the at least one electronic control unit is further programmed to accelerate the vehicle from a time point when part of the vehicle enters the adjacent lane in the lane change period.

* * * * *